(12) United States Patent
Biribuze et al.

(10) Patent No.: US 7,856,166 B2
(45) Date of Patent: Dec. 21, 2010

(54) HIGH-DENSITY PATCH-PANEL ASSEMBLIES FOR OPTICAL FIBER TELECOMMUNICATIONS

(75) Inventors: Eric Biribuze, Hickory, NC (US); Christopher P. Lewallen, Hudson, NC (US); James P. Luther, Hickory, NC (US); Daniel S. McGranahan, Fort Worth, TX (US); Micah C. Isenhour, Lincolnton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/231,376

(22) Filed: Sep. 2, 2008

(65) Prior Publication Data

US 2010/0054681 A1    Mar. 4, 2010

(51) Int. Cl.
    *G02B 6/00* (2006.01)
(52) U.S. Cl. .................................. 385/135; 385/134
(58) Field of Classification Search ................. 385/135
    See application file for complete search history.

(56) References Cited

U.S. PATENT DOCUMENTS

| | | | |
|---|---|---|---|
| 4,911,662 A | 3/1990 | Debortoli et al. | 439/719 |
| 5,024,498 A | 6/1991 | Becker et al. | 350/96.1 |
| 5,067,784 A | 11/1991 | Debortoli et al. | 385/53 |
| 5,071,211 A | 12/1991 | Debortoli et al. | 385/76 |
| 5,071,220 A | 12/1991 | Ruello et al. | 385/135 |
| 5,127,082 A | 6/1992 | Below et al. | 385/135 |
| 5,129,030 A | 7/1992 | Petrunia | 385/135 |
| 5,167,001 A | 11/1992 | Debortoli et al. | 385/135 |
| 5,204,929 A | 4/1993 | Machall et al. | 385/135 |
| 5,209,572 A | 5/1993 | Jordan | 384/18 |
| 5,243,679 A | 9/1993 | Sharrow et al. | 385/135 |

(Continued)

FOREIGN PATENT DOCUMENTS

JP    2005-148327    6/2005

(Continued)

OTHER PUBLICATIONS

Siecor, SRP-003-285, "FDC® Unit Installation," Issue 1, Mar. 1992, 18 pages.

(Continued)

*Primary Examiner*—Ryan Lepisto
(74) *Attorney, Agent, or Firm*—John H. Vynalek

(57) ABSTRACT

Patch panel assemblies (150) that contain patch panel modules (50) for use in optical fiber telecommunication systems are disclosed. One of the patch panel assemblies includes a front mounting frame (210F) and at least one internal mounting frame (210I) that support a plurality of patch panel modules. The patch panel assembly also includes a hinge assembly (224) configured allow bend-insensitive fiber cables (70) to be routed therethrough. One of the patch panel assemblies includes a housing (152) with a drawer (270) that supports a plurality of patch panel modules. The patch panel modules employ bend-insensitive optical fibers (12C) to connect front and rear ports (92, 98) so that the patch panels have a reduced size as compared to conventional patch panel modules. The patch panel assemblies include a cable distribution box (300) that can store excess cable and that assists in routing bend-insensitive fiber optic cables within the patch panel assembly interior (200) in order to connect to select patch panel module jacks (90).

20 Claims, 29 Drawing Sheets

U.S. PATENT DOCUMENTS

| | | | | |
|---|---|---|---|---|
| 5,339,379 | A | 8/1994 | Kutsch et al. | 385/135 |
| 5,398,295 | A | 3/1995 | Chang et al. | 385/58 |
| 5,401,193 | A | 3/1995 | Lo Cicero et al. | 439/713 |
| 5,490,229 | A | 2/1996 | Ghandeharizadeh et al. | 385/135 |
| 5,497,444 | A | 3/1996 | Wheeler | 385/135 |
| 5,511,144 | A | 4/1996 | Hawkins et al. | 385/135 |
| 5,613,030 | A | 3/1997 | Hoffer et al. | 385/135 |
| 5,640,482 | A | 6/1997 | Barry et al. | 385/135 |
| 5,647,045 | A | 7/1997 | Robinson et al. | 385/135 |
| 5,701,380 | A | 12/1997 | Larson et al. | 385/134 |
| 5,717,810 | A | 2/1998 | Wheeler | 385/135 |
| 5,758,003 | A | 5/1998 | Wheeler et al. | 385/134 |
| 5,781,686 | A | 7/1998 | Robinson et al. | 385/135 |
| 5,945,633 | A | 8/1999 | Ott et al. | 174/59 |
| 5,946,440 | A | 8/1999 | Puetz | 385/135 |
| 5,975,769 | A | 11/1999 | Larson et al. | 385/53 |
| 6,236,795 | B1 | 5/2001 | Rodgers | 385/134 |
| 6,245,998 | B1 | 6/2001 | Curry et al. | 174/72 A |
| 6,269,212 | B1 | 7/2001 | Schiattone | 385/135 |
| 6,321,017 | B1 | 11/2001 | Janus et al. | 385/134 |
| 6,418,262 | B1 | 7/2002 | Puetz et al. | 385/134 |
| 6,438,310 | B1 | 8/2002 | Lance et al. | 385/135 |
| 6,591,051 | B2 | 7/2003 | Solheid et al. | 385/134 |
| 6,614,978 | B1 | 9/2003 | Caveney | 385/135 |
| 6,631,237 | B2 * | 10/2003 | Knudsen et al. | 385/134 |
| RE38,311 | E | 11/2003 | Wheeler | 385/135 |
| 6,647,197 | B1 | 11/2003 | Marrs et al. | 385/134 |
| 6,741,784 | B1 | 5/2004 | Guan | 385/135 |
| 6,804,447 | B2 | 10/2004 | Smith et al. | 385/134 |
| 6,845,207 | B2 | 1/2005 | Schray | 385/135 |
| 6,865,331 | B2 | 3/2005 | Mertesdorf | 385/135 |
| 6,915,058 | B2 | 7/2005 | Pons | 385/135 |
| 6,920,274 | B2 | 7/2005 | Rapp et al. | 385/135 |
| 6,944,383 | B1 | 9/2005 | Herzog et al. | 385/123 |
| 6,944,389 | B2 | 9/2005 | Giraud et al. | 385/135 |
| 6,980,725 | B1 * | 12/2005 | Swieconek | 385/135 |
| 7,031,588 | B2 | 4/2006 | Cowley et al. | 385/135 |
| 7,068,907 | B2 | 6/2006 | Schray | 385/135 |
| 7,079,744 | B2 | 7/2006 | Douglas et al. | 385/135 |
| 7,110,654 | B2 | 9/2006 | Dillat | 385/135 |
| 7,120,349 | B2 | 10/2006 | Elliott | 385/137 |
| 7,171,099 | B2 | 1/2007 | Barnes et al. | 385/135 |
| 7,194,181 | B2 | 3/2007 | Holmberg et al. | 385/135 |
| 7,200,316 | B2 | 4/2007 | Giraud et al. | 385/135 |
| 7,266,283 | B2 | 9/2007 | Kline et al. | 385/137 |
| 7,302,153 | B2 | 11/2007 | Thom | 385/135 |
| 7,308,184 | B2 | 12/2007 | Barnes et al. | 385/135 |
| 7,315,681 | B2 | 1/2008 | Kewitsch | 385/135 |
| 7,349,615 | B2 | 3/2008 | Frazier et al. | 385/135 |
| 7,376,321 | B2 | 5/2008 | Bolster et al. | 385/135 |
| 7,376,323 | B2 | 5/2008 | Zimmel | 385/135 |
| 7,397,996 | B2 | 7/2008 | Herzog et al. | 385/135 |
| 7,409,137 | B2 | 8/2008 | Barnes | 385/135 |
| 7,418,182 | B2 | 8/2008 | Krampotich | 385/135 |
| 7,437,049 | B2 | 10/2008 | Krampotich | 385/135 |
| 7,454,113 | B2 | 11/2008 | Barnes | 385/135 |
| 7,463,811 | B2 | 12/2008 | Trebesch et al. | 385/135 |
| 7,474,828 | B2 | 1/2009 | Leon et al. | 385/135 |
| 7,480,438 | B2 | 1/2009 | Douglas et al. | 385/135 |
| 7,488,205 | B2 | 2/2009 | Spisany et al. | 439/540.1 |
| 7,493,002 | B2 | 2/2009 | Coburn et al. | 385/135 |
| 7,499,623 | B2 | 3/2009 | Barnes et al. | 385/135 |
| 7,509,016 | B2 | 3/2009 | Smith et al. | 385/135 |
| 7,522,804 | B2 | 4/2009 | Araki et al. | 385/135 |
| 7,526,171 | B2 | 4/2009 | Caveney et al. | 385/135 |
| 7,529,458 | B2 | 5/2009 | Spisany et al. | 385/137 |
| 7,534,958 | B2 | 5/2009 | McNutt et al. | 174/68.1 |
| 7,536,075 | B2 | 5/2009 | Zimmel | 385/135 |
| 7,555,193 | B2 | 6/2009 | Rapp et al. | 385/137 |
| 7,565,051 | B2 | 7/2009 | Vongseng | 385/135 |
| 7,567,744 | B2 | 7/2009 | Krampotich et al. | 385/135 |
| 7,570,860 | B2 | 8/2009 | Smrha et al. | 385/135 |
| 7,570,861 | B2 | 8/2009 | Smrha et al. | 385/135 |
| 7,577,331 | B2 | 8/2009 | Laurisch et al. | 385/135 |
| 7,607,938 | B2 | 10/2009 | Clark et al. | 439/540.1 |
| 7,620,287 | B2 | 11/2009 | Appenzeller et al. | 385/135 |
| 7,668,430 | B2 | 2/2010 | McClellan et al. | 385/134 |
| 7,672,561 | B1 | 3/2010 | Keith et al. | 385/135 |
| 7,676,135 | B2 | 3/2010 | Chen | 385/135 |
| 2002/0181922 | A1 | 12/2002 | Xin et al. | 385/135 |
| 2004/0086252 | A1 | 5/2004 | Smith et al. | 385/135 |
| 2004/0175090 | A1 | 9/2004 | Vastmans et al. | 385/135 |
| 2005/0201073 | A1 | 9/2005 | Pincu et al. | 361/797 |
| 2006/0018622 | A1 | 1/2006 | Caveney et al. | 385/135 |
| 2006/0193591 | A1 | 8/2006 | Rapp et al. | 385/137 |
| 2007/0003204 | A1 | 1/2007 | Makrides-Saravanos et al. | 385/135 |
| 2007/0031099 | A1 | 2/2007 | Herzog et al. | 385/135 |
| 2007/0047894 | A1 | 3/2007 | Holmberg et al. | 385/135 |
| 2008/0069512 | A1 | 3/2008 | Barnes et al. | 385/135 |
| 2008/0080826 | A1 | 4/2008 | Leon et al. | 385/135 |
| 2008/0080827 | A1 | 4/2008 | Leon et al. | 385/135 |
| 2008/0080828 | A1 | 4/2008 | Leon et al. | 385/135 |
| 2008/0089656 | A1 | 4/2008 | Wagner et al. | 385/135 |
| 2008/0106871 | A1 | 5/2008 | James | 361/727 |
| 2008/0175550 | A1 | 7/2008 | Coburn et al. | 385/134 |
| 2008/0175551 | A1 * | 7/2008 | Smrha et al. | 385/135 |
| 2008/0175552 | A1 * | 7/2008 | Smrha et al. | 385/135 |
| 2008/0219634 | A1 | 9/2008 | Rapp et al. | 385/135 |
| 2008/0247723 | A1 | 10/2008 | Herzog et al. | 385/135 |
| 2008/0267573 | A1 | 10/2008 | Douglas et al. | 385/135 |
| 2008/0298763 | A1 | 12/2008 | Appenzeller et al. | 385/135 |
| 2008/0304803 | A1 | 12/2008 | Krampotich et al. | 385/135 |
| 2009/0010607 | A1 | 1/2009 | Elisson et al. | 385/135 |
| 2009/0022470 | A1 | 1/2009 | Krampotich | 385/135 |
| 2009/0067800 | A1 | 3/2009 | Vazquez et al. | 385/135 |
| 2009/0136194 | A1 | 5/2009 | Barnes | 385/135 |
| 2009/0136196 | A1 | 5/2009 | Trebesch et al. | 385/135 |
| 2009/0148117 | A1 | 6/2009 | Laurisch | 385/135 |
| 2009/0180749 | A1 | 7/2009 | Douglas et al. | 385/135 |
| 2009/0196563 | A1 | 8/2009 | Mullsteff et al. | 385/135 |
| 2009/0257726 | A1 | 10/2009 | Redmann et al. | 385/135 |
| 2009/0257727 | A1 | 10/2009 | Laurisch et al. | 385/135 |
| 2009/0269018 | A1 | 10/2009 | Fröhlich et al. | 385/135 |
| 2009/0274429 | A1 | 11/2009 | Krampotich et al. | 385/135 |
| 2009/0274430 | A1 | 11/2009 | Krampotich et al. | 385/135 |
| 2010/0061691 | A1 | 3/2010 | Murano et al. | 385/135 |
| 2010/0061693 | A1 | 3/2010 | Bran De Leon et al. | 385/135 |
| 2010/0111483 | A1 | 5/2010 | Reinhardt et al. | 385/135 |

FOREIGN PATENT DOCUMENTS

| | | |
|---|---|---|
| JP | 2007-47336 | 2/2007 |
| WO | WO 95/20175 A1 | 7/1995 |
| WO | WO98/25416 | 6/1998 |
| WO | WO00/05611 | 2/2000 |
| WO | WO2007/050515 A1 | 5/2007 |

OTHER PUBLICATIONS

Siecor, SRP-003-285, "FDC® Unit Installation," Issue 7, Nov. 1996, 1 page.

Leviton, "Opt-X Ultra™ Riber Rack-Mount Enclosure," 2008, 3 pages.

Siemon Corporation, Fiber Connect Panel (FCP3), Dec. 11, 2007, 4 pages.

* cited by examiner

HIGH-DENSITY PATCH-PANEL ASSEMBLIES FOR OPTICAL FIBER TELECOMMUNICATIONS

FIELD OF THE INVENTION

The present invention relates generally to optical fiber telecommunications equipment and networks, and in particular relates to patch panel assemblies that can contain a relatively high density of patch panel modules.

BACKGROUND OF THE INVENTION

Typical optical telecommunication systems and networks include one or more telecommunications data centers that provide large numbers of optical and electrical cable connections that join various types of network equipment. The typical system also includes a number of outlying stations that extend the system into a network. Examples of network equipment include electrically-powered (active) units such as optical line terminals (OLTs), optical network terminals (ONTs), network interface devices (NIDs), servers, splitters, combiners, multiplexers, switches and routers, fanout boxes and patch panels. This network equipment is often installed within cabinets in standard-sized equipment racks. Each piece of equipment typically provides one or more adapters where optical or electrical patch cables ("jump cables") can be physically connected to the equipment. These patch cables are generally routed to other network equipment located in the same cabinet or in another cabinet.

A common problem in telecommunications systems, and in particular with optical telecommunications equipment, is space management. Current practice in telecommunications is to utilize standard electronics racks or frames that support standards-sized stationary rack-mounted housings with widths of 19 or 23 inches horizontal spacing. Vertical spacing has been divided into rack units "U", where 1U=1.75 inches as specified in EIA (Electronic Industries Alliance) 310-D, IEC (International Electrotechnical Commission) 60297 and DIN ("German Institute for Standardization") 41494 SC48D. The housings may be fixed, slide-out, or swing-out patch/splice panels or shelves. However, the configurations and sizes of present-day housings for optical telecommunications equipment have been defined largely by the properties of the fiber optic cables that connect to the devices supported by the housings. In particular, the configurations and sizes have been established based on the particular ability of the fiber optic cables and optical fibers therein to interface with the devices without exceeding the bending tolerance of the fiber optic cable and/or the optical fibers. This has resulted in telecommunications equipment that occupies relatively large amounts of space, and in particular a relatively large amount of floor space in a central office of a telecommunications network. It has also lead to data center patch panels being increasingly overpopulated due to connector and cable volumes.

SUMMARY OF THE INVENTION

The present invention relates to patch panel assemblies that can support a relatively high density of patch panels. The patch panel assemblies have a configurations that takes advantage of cable fibers and jumper fibers that are bend-insensitive. The use of multiple rows of patch panel modules serves to distribute the density to enable ease of finger access to the modules, and facilitates the use of RFID systems that have difficulty reading densely packed RFID tags.

Accordingly, a first aspect of the invention is a patch panel assembly for a telecommunication data center for providing optical connections using bend-insensitive optical fiber cables. The assembly includes a rectangular, box-like housing having an interior region, a front side and a back side. The housing is sized to be operably supported by a standard telecommunications rack. The assembly further includes a front mounting frame and at least one interior mounting frame, wherein the mounting frames are configured to support at least one reduced-form-factor patch panel module.

A second aspect of the invention is a patch panel module. The patch panel module includes a substantially rectangular module housing that includes a front side having at least one angled facet, an opposing back side, opposing ends, and opposing sidewalls that define an interior region. The module includes at least one jack arranged on the at least one angled facet, with the at least one jack defining one or more front-side ports. The module includes at least one backside port operably connected to the at least one jack via at least one bend-insensitive cable fiber contained within the housing interior region. A lengthwise open channel is formed in the backside of the module housing and is sized to accommodate an external bend-insensitive optical cable.

A third aspect of the invention is a patch panel assembly for a telecommunication data center for providing optical connections using bend-insensitive optical fiber cables. The assembly includes a rectangular, box-like housing having opposing side walls and a back panel that defines an interior, the housing sized to be operably supported by a standard telecommunications rack. The assembly includes a drawer having a front end and a floor panel and is configured to slide in and out of the housing interior, and is also configured to support an array of patch panel modules on the floor panel in a substantially horizontal configuration. The assembly also includes at least one movable cable guide arranged in the housing and configured to guide at least one bend-resistant fiber optic cable and to move to accommodate the sliding of the drawer in and out of the housing.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

DETAILED DESCRIPTION OF THE INVENTION

Figure 1:
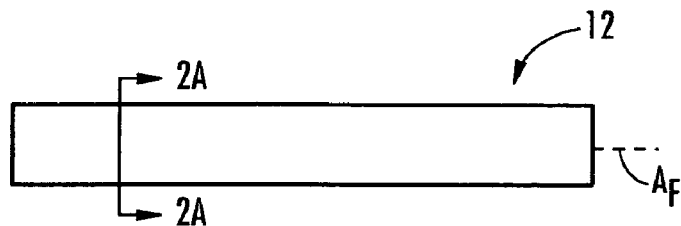
FIG. 1 is a schematic side view of a section of an example embodiment of a bend-insensitive optical fiber in the form of a nanostructure optical fiber.

Reference is now made in detail to the present preferred embodiments of the invention, examples of which are illustrated in the accompanying drawings. Whenever possible, the same or similar reference numerals are used throughout the drawings to refer to the same or similar parts. It should be understood that the embodiments disclosed herein are merely examples, each incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Terms such as "horizontal," "vertical," "front," "back," etc., are used herein for the sake of reference in the drawings and ease of description and are not intended to be strictly limiting either in the description or in the claims as to an absolute orientation and/or direction. Also, the term "bend-insensitive fiber optic cable" is intended to include cable that includes one or more bend-insensitive optical fibers.

Bend-Insensitive Optical Fibers

Example embodiments of the present invention make use of bend-insensitive or "bend performance" fibers such as those in the form of so-called "nanostructure" or "holey" optical fibers. There are a number of such fibers on the market today. Nanostructure fibers have one or more regions with periodically or aperiodically arranged small holes or voids, which make the fiber extremely bend insensitive. Examples of such optical fibers are described in, for example, U.S. Pat. No. 6,243,522, pending U.S. patent application Ser. No. 11/583,098 filed Oct. 18, 2006 (hereinafter, "the Corning nanostructure fiber patents and patent applications"), all of which are assigned to Corning Incorporated, and all of which are incorporated by reference herein.

Bend-insensitive fibers as used in the present invention include, for example, nanostructure fibers of the type available from Corning, Inc., of Corning, N.Y., including, but not limited to, single-mode, multi-mode, bend performance fiber, bend-optimized fiber and bend-insensitive optical fiber. Nanostructure fibers are advantageous in that they allow for the patch panel modules and patch panel assemblies of the present invention to have fibers with relatively small-radius bends while optical attenuation in the fibers remains extremely low. One example of a bend-insensitive optical fiber includes a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 µm, and more preferably between about 8.0 and 10.0 µm.

One type of nanostructure optical fiber developed by Corning, Inc., has an annular ring of non-periodic airlines (of diameter $\sim 1 \times 10^{-7}$ m) that extend longitudinally along the length of the fiber. The region with the ring of airlines has a reduced apparent or average index of refraction, because air has an index of refraction of approximately 1 compared to the fused silica matrix refractive index of approximately 1.46. The ring of airlines is positioned to create a refractive index profile that enables superior bend performance (optically) and significantly smaller minimum bend radius specifications.

Figure 2A:
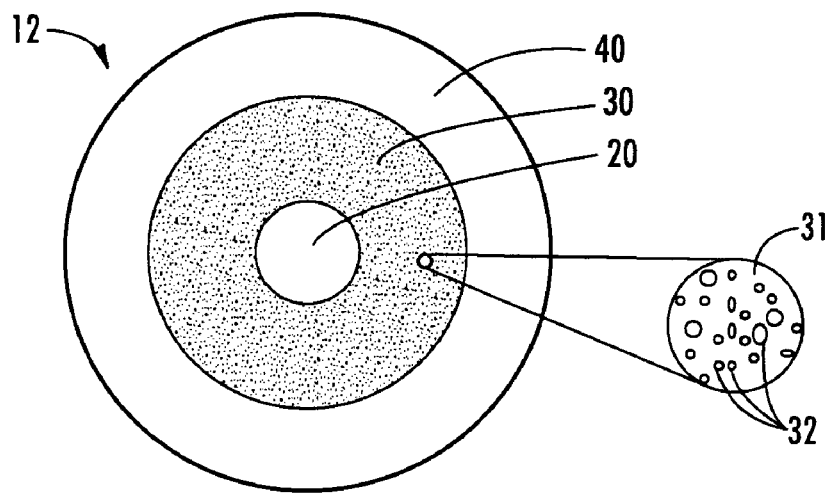
FIG. 2A is a schematic cross-section of the optical fiber of FIG. 1 as viewed along the direction 2A-2A.

FIG. 1 is a schematic side view of a section of an example embodiment of a bend-insensitive fiber in the form of a nanostructure optical fiber ("nanostructure fiber") 12 having a central axis AF. FIG. 2A is a schematic cross-section of nanostructure fiber 12 as viewed along the direction 2A-2A in FIG. 1. Nanostructure fiber 12 can be, for example, any one of the various types of nanostructure optical fibers, such as any of the so-called "holey" fibers, or those described in the above-mentioned Corning nanostructure fiber patents and patent applications. For the purposes of the present invention, a "bend-insensitive fiber" includes nanostructure fibers that make use of periodic or non-periodic nanostructures or holes.

In an example embodiment, nanostructure optical fiber 12 includes a core region ("core") 20, a nanostructure region 30 surrounding the core, and an outer cladding region 40 ("cladding") surrounding the nanostructure region. Other ring-type configurations for nanostructure optical fiber 12 are also known. A protective cover or sheath (not shown) optionally covers outer cladding 40.

In an example embodiment, nanostructure region 30 comprises a glass matrix ("glass") 31 having formed therein non-periodically disposed holes (also called "voids" or "airlines") 32, such as the example voids shown in detail in the magnified inset of FIG. 2A. In another example embodiment, voids 32 may be periodically disposed, such as in a photonic crystal optical fiber, wherein the voids typically have diameters between about $1 \times 10^{-6}$ m and $1 \times 10^{-5}$ m. Voids 32 may also be "non-periodic airlines. In an example embodiment, glass 31 is fluorine-doped while in another example embodiment the glass is undoped pure silica. By "non-periodically disposed" or "non-periodic distribution," it is meant that when one takes a cross-section of the optical fiber (such as shown in FIG. 2A), the voids 32 are randomly or non-periodically distributed across a portion of the fiber.

Cross sections similar to FIG. 2A taken at different points along the length of nanostructure optical fiber 12 will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodically disposed holes/voids 32 are employed in nanostructure region 30, it is desirable in one example embodiment that they be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× to about 4000× and image analysis software, such as ImagePro, which is available from Media Cybernetics, Inc. of Silver Spring, Md., USA.

In an example embodiment, holes/voids 32 can contain one or more gases, such as argon, nitrogen, or oxygen, or the holes can contain a vacuum with substantially no gas; regardless of the presence or absence of any gas, the refractive index of the hole-containing region is lowered due to the presence of the holes. The holes can be periodically or non-periodically disposed. In some embodiments, the plurality of holes comprises a plurality of non-periodically disposed holes and a plurality of periodically disposed holes. Alternatively, or in addition, as mentioned above, the depressed index can also be provided by downdoping the glass in the hole-containing region (such as with fluorine) or updoping one or both of the surrounding regions.

Nanostructure region 30 can be made by methods that utilize preform consolidation conditions, which are effective at trapping a significant amount of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose end points are disposed on the silica internal surface defining the hole when the optical fiber is viewed in a perpendicular cross-section transverse to the optical fiber central axis AF.

SEM analysis of the end face of an example nanostructure optical fiber 12 showed an approximately 4.5 micron radius $GeO_2$—$SiO_2$ void-free core (having an index of approximately +0.34 percent delta versus silica) surrounded by a 11-micron outer radius void-free near cladding region surrounded by 14.3-micron outer radius non-periodic void-containing cladding region (ring thickness of approximately 3.3 μm), which is surrounded by a void-free pure silica outer cladding having an outer diameter of about 125 μm (all radial dimensions measured from the center of the optical fiber).

The nanostructure region comprised approximately 2.5 percent regional area percent holes (100% $N_2$ by volume) in that area with an average diameter of 0.28 μm and the smallest diameter holes at 0.17 μm and a maximum diameter of 0.48 μm, resulting in a total of about 130 holes in the fiber cross-section. The total fiber void area percent (area of the holes divided by total area of the optical fiber cross-section×100) was about 0.05 percent. Optical properties for this fiber were 0.36 and 0.20 dB/Km at 1310 and 1550 nm, respectively, and a 22-meter fiber cable cut-off of about 1250 nm, thereby making the fiber single mode at wavelengths above 1250 nm.

The nanostructure optical fibers as used herein may or may not include germania or fluorine to adjust the refractive index of the core and/or cladding of the optical fiber, but these dopants can also be avoided in the intermediate annular region and instead, the holes (in combination with any gas or gases that may be disposed within the holes) can be used to adjust the manner in which light is guided down the fiber core. The nanostructure region may consist of undoped (pure) silica, thereby completely avoiding the use of any dopants in the hole-containing region, to achieve a decreased refractive index, or the nanostructure region may comprise doped silica, e.g. fluorine-doped silica having a plurality of holes. In one set of embodiments, the core includes doped silica to provide a positive refractive index relative to pure silica, e.g. germania doped silica. The core region is preferably hole-free.

Such fiber can be made to exhibit a fiber cut-off of less than 1400 nm, more preferably less than 1310 nm, a 20-mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12-mm macrobend induced loss at 1550 nm of less than 5 dB/turn, preferably less than 1 dB/turn, more preferably less than 0.5 dB/turn, even more preferably less than 0.2 dB/turn, still more preferably less than 0.1 dB/turn, still even more preferably less than 0.05 dB/turn, and an 8-mm macrobend induced loss at 1550 nm of less than 5 dB/turn, preferably less than 1 dB/turn, more preferably less than 0.5 dB/turn, and even more preferably less than 0.2 dB/turn, and still even more preferably less than 0.1 dB/turn.

The nanostructure fibers used herein may be multimode. Multimode optical fibers disclosed herein comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic shape. The depressed-index annular portion may, for example, comprise glass comprising a plurality of voids, or fluorine-doped glass, or fluorine-doped glass comprising a plurality of voids.

In some embodiments, the multimode optical fiber comprises a graded-index glass core; and a cladding surrounding and in contact with the core, the cladding comprising a depressed-index annular portion surrounding the core, said depressed-index annular portion having a refractive index delta less than about −0.2% and a width of at least 1 micron, said depressed-index annular portion spaced from said core at least 0.5 microns.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded-index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least 0.5 microns and the fiber further exhibits a 1 turn 10 mm diameter mandrel wrap attenuation increase, of less than or equal to 0.4 dB/turn at 850 nm, a numerical aperture of greater than 0.18, and an overfilled bandwidth greater than 1.5 GHz-km at 850 nm.

Using the designs disclosed herein, 50 micron diameter core multimode fibers can been made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at a wavelength of 850 nm. These high bandwidths can be achieved while still maintaining a 1 turn 10 mm diameter mandrel wrap attenuation increase at a wavelength of 850 nm, of less than 0.5 dB, more preferably less than 0.3 dB, even more preferably less than 0.2 dB, and most preferably less than 0.15 dB. These high bandwidths can also be achieved while also maintaining a 1 turn 20 mm diameter mandrel wrap attenuation increase at a wavelength of 850 nm, of less than 0.2 dB, more preferably less than 0.1 dB, and most preferably less than 0.05 dB, and a 1 turn 15 mm diameter mandrel wrap attenuation increase at a wavelength of 850 nm, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than 500 MHz-km, more preferably greater than 600 MHz-km, even more preferably greater than 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm. In some embodiments it may be desirable to spin the multimode fiber, as doing so may in some circumstances further improve the bandwidth for optical fiber having a depressed cladding region. By spinning, we mean applying or imparting a spin to the fiber wherein the spin is imparted while the fiber is being drawn from an optical fiber preform, i.e. while the fiber is still at least somewhat heated and is capable of undergoing non-elastic rotational displacement and is capable of substantially retaining the rotational displacement after the fiber has fully cooled.

In some embodiments, the numerical aperture (NA) of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Fiber Bend Angle and Bend Diameter

Figure 2B:
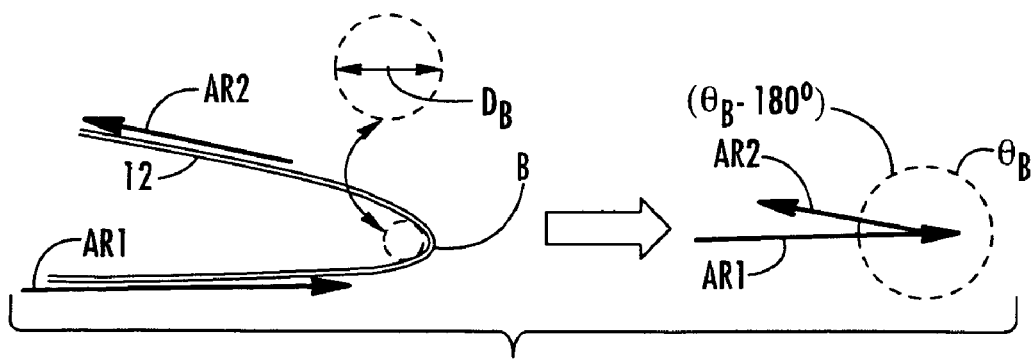
FIG. 2B is a schematic diagram illustrating the bend angle $\theta_B$ and the bend diameter $D_B$ of a bend B formed in the bend-insensitive optical fiber of FIG. 1.

FIG. 2B is a schematic diagram illustrating a bend angle $\theta_B$ and a bend diameter $D_B$ of an example bend-insensitive optical fiber in the form of nanostructure fiber 12 having a bend formed therein. Bend diameter $D_B$ is twice the bend radius $R_B$. Two arrows AR1 and AR2 represent the relative orientations (directions) of optical fiber 12 on either side of bend B. Bend angle $\theta_B$ is defined by the intersection of arrows AR1 and AR2, as shown in the right-hand side of FIG. 2B. Because sections of optical fiber do not always remain perfectly straight before and after a bend, the bend angle $\theta_B$ is not exact, but serves as a useful approximation that generally describes the degree to which nanostructure fiber 12 is bent.

In an example embodiment, the bend-insensitive optical fibers used in the present invention have bends like bend B with a bend diameter $D_B$ as small as 10 mm. This, in part, allows for the patch panel modules of the present invention to be made relatively compact and to allow for the patch panel assemblies to contain a relatively high density of patch-panel modules and thus a high-density of jacks and ports for establishing optical connections.

In the discussion hereinafter, for the sake of convenience, reference number 12 is used to refer to bend-insensitive fibers generally, with bend-insensitive "cable fibers" carried by a bend-insensitive fiber optic cable being identified as 12C to distinguish from bend-insensitive "jumper fibers," which are identified as 12J.

Reduced form Factor Patch Panel Module

Figure 3A:
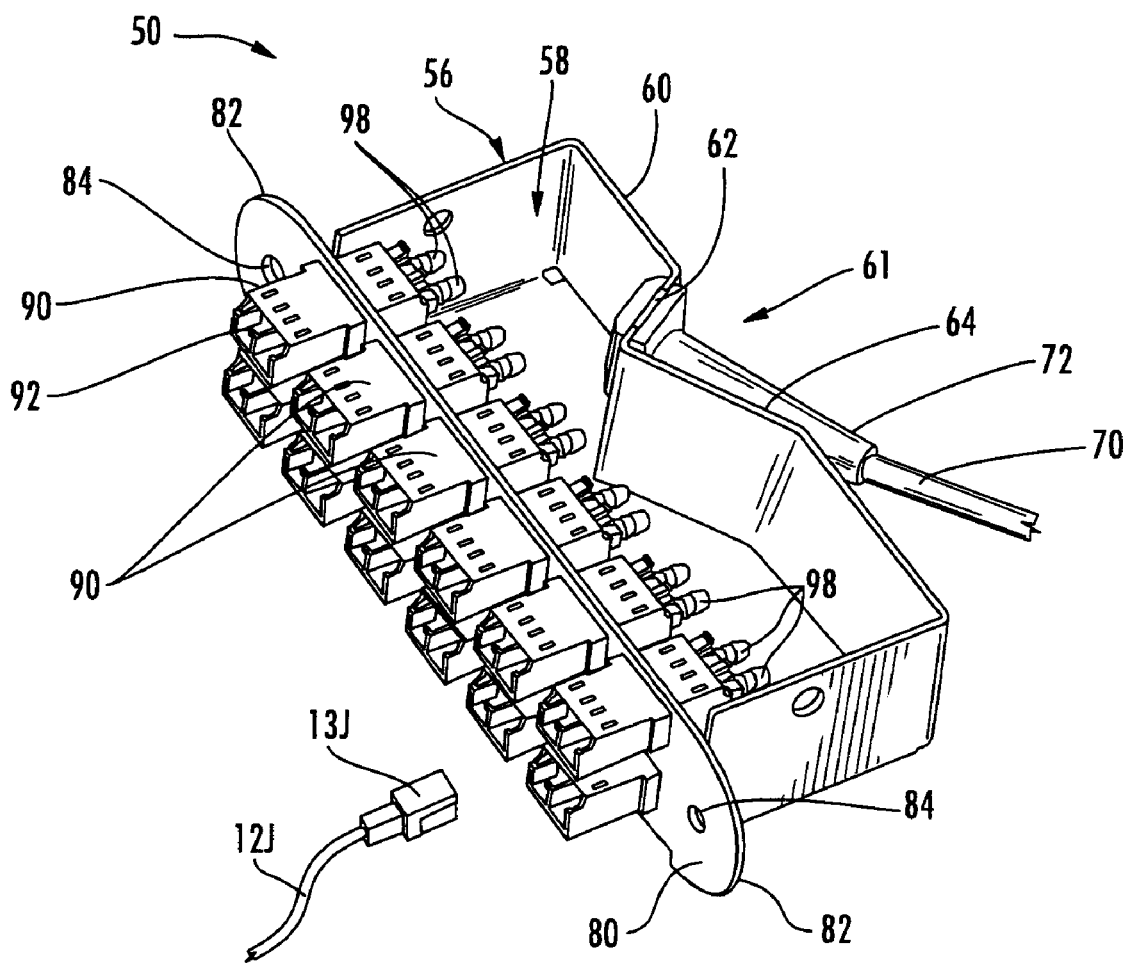
FIG. 3A is a perspective view of an example embodiment of a reduced-volume patch panel module according to the present invention showing the interior region but without the bend-insensitive cable fibers.
Figure 3B:
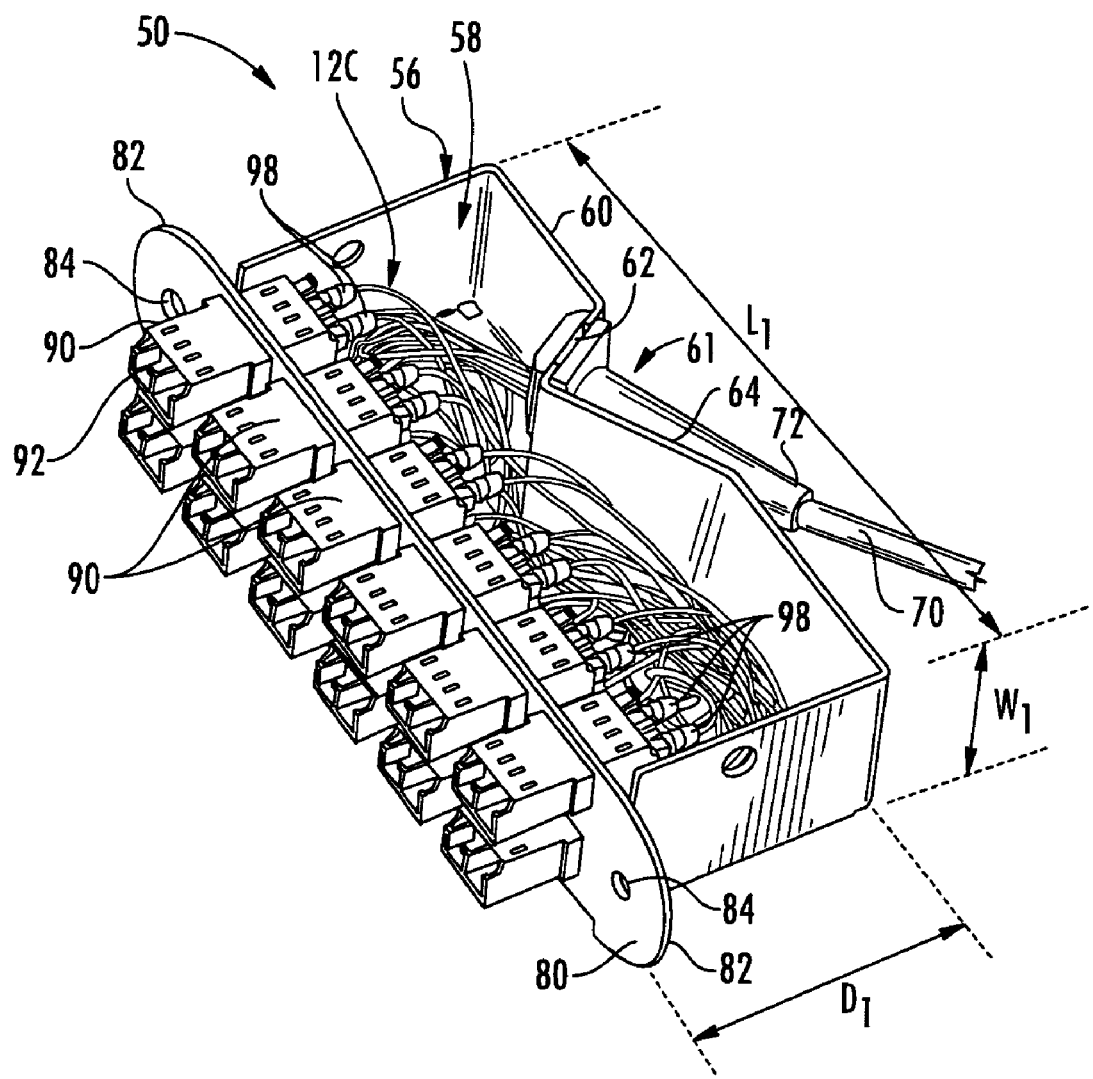
FIG. 3B is the same as FIG. 3A, but showing the bend-insensitive cable fibers that connect the bend-insensitive fiber optic cable to the backside ports of the patch panel jacks.

FIG. 3A is a perspective view of an example embodiment of a "reduced form factor" patch panel module 50 that includes a substantially rectangular module housing 56 having an interior 58 and a reduced form factor as compared to a standard patch panel module. Module housing 56 includes a backside wall 60 that has at least one V-shaped indentation 61 formed by first and second angled wall portions 62 and 64. Wall portion 62 includes an aperture (not shown) that allows a bend-insensitive fiber optic cable ("cable") 70 that carries one or more cable fibers 12C to connected to the housing so that the cable fibers can be introduced into interior 58, as illustrated in FIG. 3B. In an example embodiment, cable 70 includes either twelve or twenty-four buffered cable fibers 12 (having, e.g., a diameter of 500 μM or 900 μm) or a 250 μm diameter bare fibers. Cable 70 preferably includes a boot 72 to support the fiber at its connection point at wall portion 62.

Figure 3C:
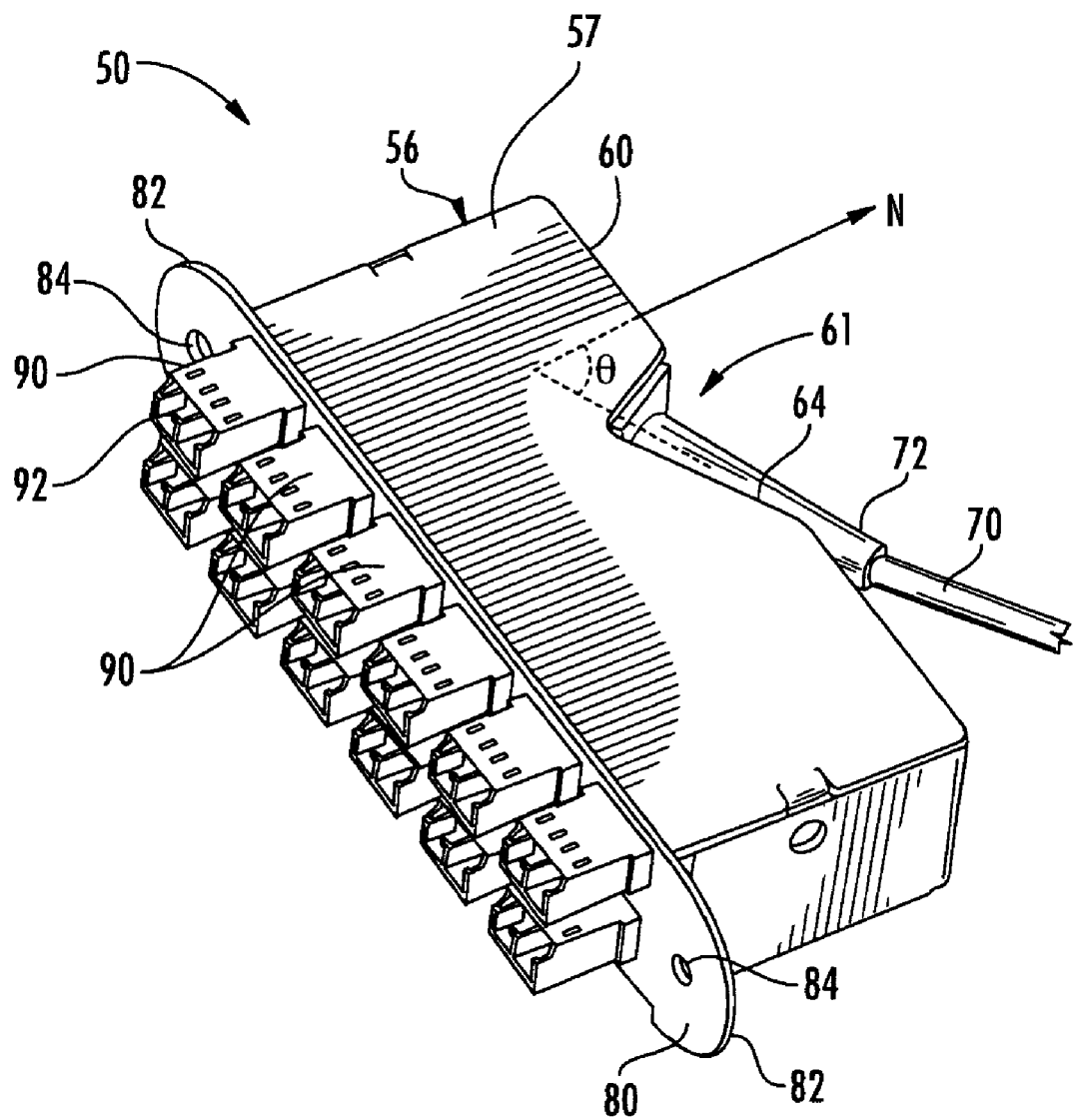
FIG. 3C is the same as FIG. 3B, but with the top panel in place and showing the angled connector for the bend-insensitive fiber optic cable.

Housing 56 also includes a front panel 80 having a number (e.g., twelve) spaced apart apertures (not shown) that hold a corresponding number (e.g., twelve) jacks 90. Front panel also includes respective ends 82 that have mounting holes 84 for mounting module 50 to panel mounting frames, introduced and described in greater detail below. FIG. 3C is the same as FIGS. 3A and 3B, but shows housing 56 having a cover 57 that encloses interior 58.

Each jack 90 defines either one or two ports 92 open at a front side 96 and configured to receive a connectorized end 13J of a jumper fiber 12J. Each jack 90 also includes backside ports 98 where one or more cable fibers 12C from bend-insensitive fiber optic cable 70 are attached. In an example embodiment, module 50 includes two rows of six jacks 90, as shown. Further to the example embodiment, one or two cable fibers 12C are connected to each jack at back side ports 98 (i.e., one cable fiber for each port 92), as illustrated in FIG. 3B.

Because cable fibers 12C are bend insensitive, they can and do have tight bends that allow them to fit into the tight space of interior 58 so as to be connected to jacks 90 at backside ports 98. The use of bend-insensitive cable fibers 12C within interior 58 also allows for the module housing 56 to have reduced dimensions and thus a reduced form factor. In an example embodiment, housing 56 has dimensions of length $L_1=4.62$ inches, width $W_1=1.295$ inches and Depth $D_1$ between about 2 inches and about 3 inches, e.g., 2.36 inches. Because depth $D_1$ can be almost half that of the corresponding prior art patch panel module, the volume of interior 58 is reduced by close to 40% over the prior art. This in turn allows for a higher density of ports 92 to be supported in a standard-size patch panel assembly.

Bend-insensitive cable fibers 12C also facilitate the connection of one or two cables 70 to patch panel module 50 at an angle relative to backside wall 60. This angled connection facilitates a high-density arrangement of patch panel modules 50 in a patch-panel assembly, as discussed in greater detail below. In an example embodiment, the angle θ formed by cable 70 relative to the normal N to backside wall 60 is between about 60 degrees and 70 degrees, as shown in FIG. 3C. Note that in an example embodiment the use of one or two V-shaped indentations 61 serves to reduce the volume of interior 58 even further. This additional reduction in interior volume is also made possible by the use of bend-insensitive cable fibers 12C.

Mounting-Frame-Type Patch Panel Assembly

Figure 4:
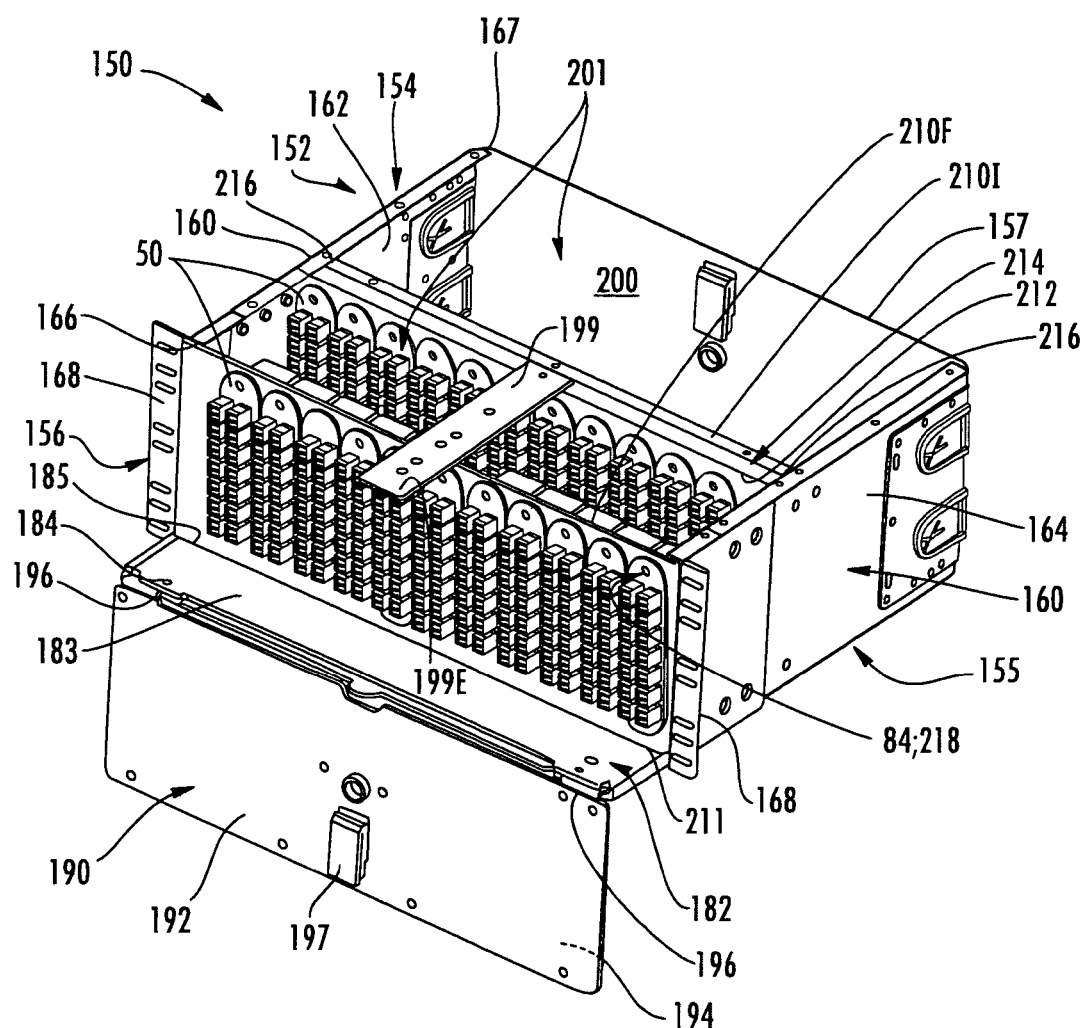
FIG. 4 is a perspective view of an example embodiment of a mounting-frame-type patch panel assembly according to the present invention that has at least two mounting frames that each support an array of reduced-volume patch panel modules in a substantially vertical orientation.

FIG. 4 is a perspective view of example embodiment of a mounting-frame-type patch panel assembly 150. In an example embodiment, patch panel assembly 150 is configured to hold at least twenty-four patch panel modules 50 in a relatively high-density, substantially vertical configuration. In a standard 4U shelf, with twelve fully populated patch panel modules 50, there are 144 duplex jacks, or 288 ports. The example patch panel assembly 150 of FIG. 4 has two rows with 288 duplex jacks 90, for a total of 576 port 92. This is a "port/U" density of 144 ports/U because the patch panel assembly is assumed to be a standard "4U" shelf. A "triple-row" embodiment having three mounting frames 210 would have a 50% increase in port density, or 216 ports/U, which represents 864 individual fibers supported by the patch panel assembly 150, as compared to a standard patch panel assembly that supports 288 fibers. In an example embodiment, the port density is given by PD and is in the range defined by: 72 ports/U<PD≦216 ports/U.

Patch panel assembly 150 includes a rectangular box-like housing 152 having a top 154 and bottom 155, a front 156 and a back panel or wall 157. Housing 152 includes spaced-apart sidewalls 160 that connect to back panel 157. Each sidewall 160 has an inside surface 162 and an outside surface 164, a front edge 166 and an opposite back edge 167. Housing 152 preferably includes outwardly extending mounting flanges 168 positioned on sidewall outer surfaces 164 at or near sidewall front edges 166.

In an example embodiment, housing 152 has standard dimensions of length $L_2$=17 inches (~10 U), Height $H_2$=6.88 inches (~4U) and a depth $D_2$=15.51 inches (~9U) (see FIG. 7) so that patch panel assembly 150 fits into a standard-sized 19" equipment rack as used in telecommunications systems (e.g., at data centers, etc.) as specified by EIA-310-D (Cabinets, Racks, Panels and Associated Equipment).

In an example embodiment, housing 152 includes a flat shelf 182 that connects sidewalls 160 at housing bottom 155 at front 156, and that extends beyond the sidewall front edges 166 at front 156. Shelf 182 has an upper surface 183, a front end 184 and a back end 185. In an example embodiment, front end 184 includes at least one hinge 196 that attaches a front cover 190 to frame 152 at front 156 so that the front cover folds downward. Front cover 190 has respective inner and outer surfaces 192 and 194. In an example embodiment, front cover 190 is transparent. Front cover optionally includes a clip 197 that is configured to engage an edge 199E of a clip plate 199 that is connected to interior mounting frame 210I and that extends over front mounting plate 210F.

Sidewalls 160, back panel 157 and front cover 180 define a housing interior region 200 that is substantially open at housing top 154. Housing 152 includes at least two mounting frames 210, and preferably includes a front mounting frame 210F and at least one interior mounting frame 210I that resided behind the front mounting frame and that spans interior region 200. Each mounting frame 210 has a bottom edge 211 and respective front and back sides or "faces" 212 and 214 and opposite ends 216. In an example embodiment, mounting frames 210 are connected to sidewalls 160 (e.g., at inside surface 162) at opposite ends 216. In an example embodiment, front mounting frame 210F is attached to front edges 166. Mounting frames 210 serve to divide the interior region into interior sub-regions 201.

Figure 5:
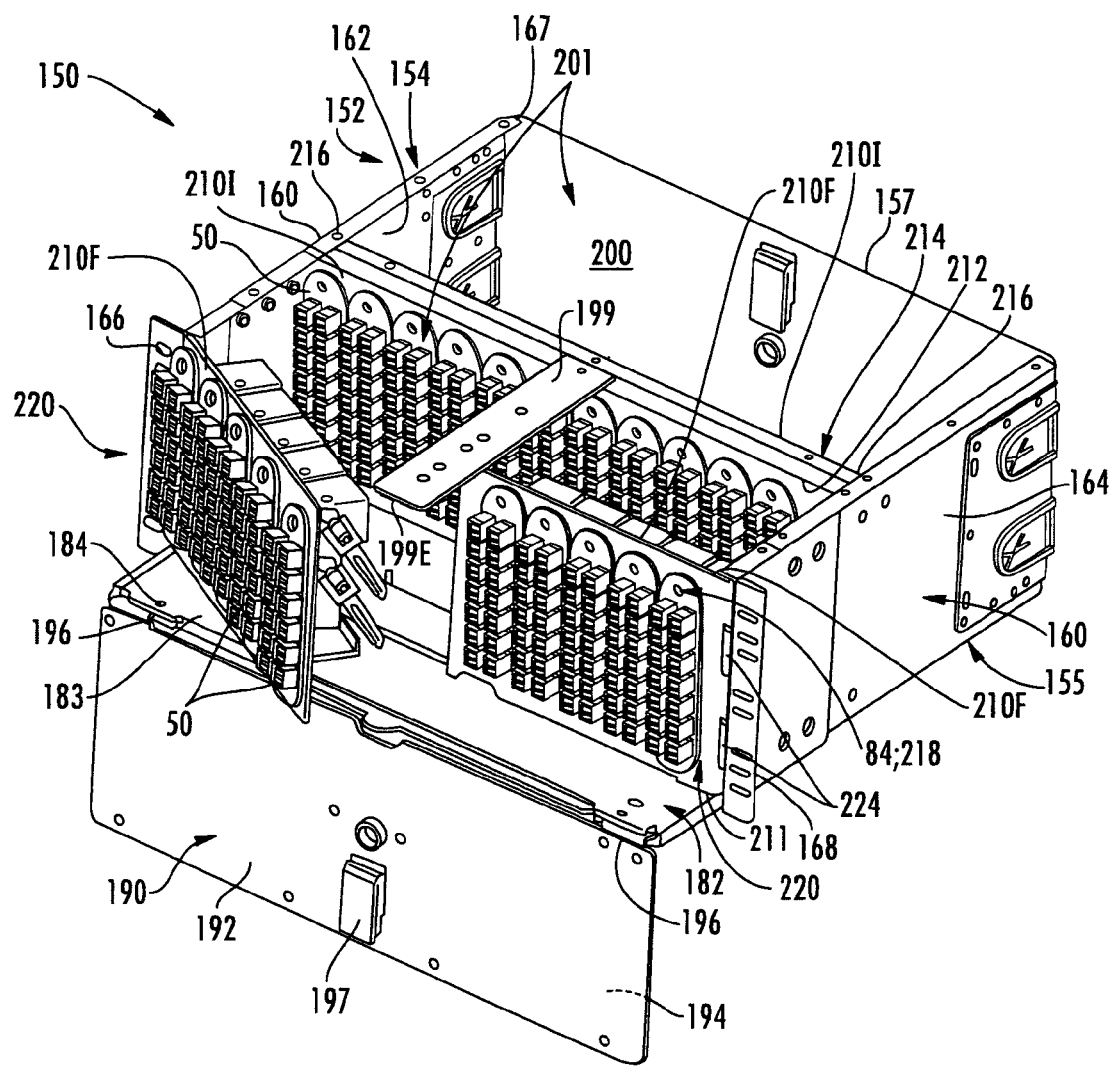
FIG. 5 is a perspective view similar to that of FIG. 4 illustrating an example embodiment of a mounting-frame-type patch panel assembly having dual-hinged front mounting frame.

Each mounting frame front face 212 presents a mounting surface configured so that at least one and preferably more (e.g., preferably ten to twelve) patch panel modules 50 can be mounted thereto, e.g., at threaded holes 218 configured to correspond to mounting holes 84 of patch panel modules 50. In an example embodiment illustrated in FIG. 5, one or more of the mounting frames 210 are made up of two sections 220, each of which are connected to respective sidewalls 160 via respective hinges 224 that allows the sections swing outwardly. In FIG. 5, front mounting frame 210F is shown as being made up of two sections. This geometry allows access to mounting panels 210 located immediately behind another mounting panel. In an alternative embodiment, one or more of mounting frames 210 are hinged on one side with one or more hinges 224 so that the entire hinged mounting frame swings open in door-like fashion.

Figure 6:
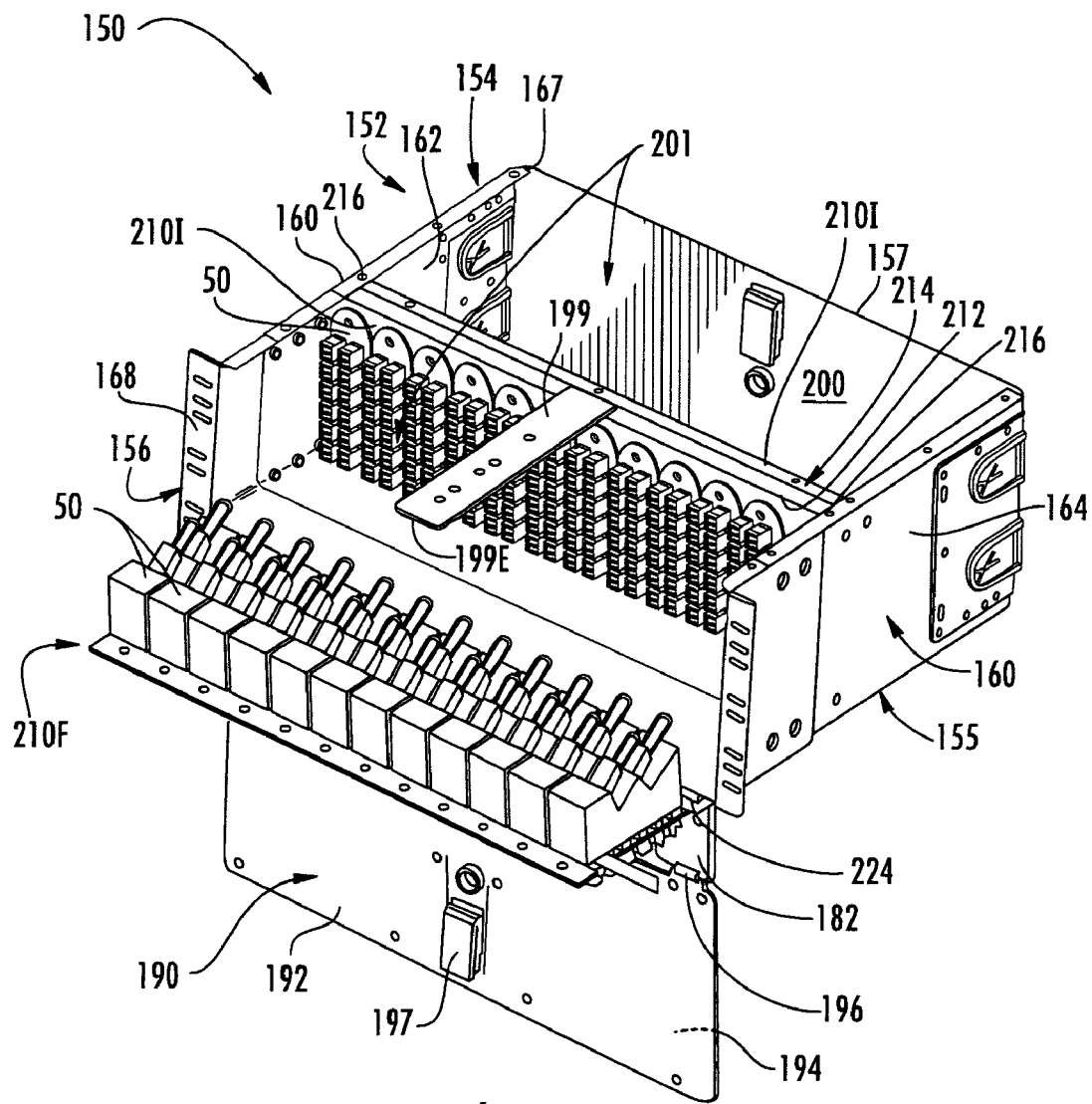
FIG. 6 is a perspective view similar to that of FIG. 5, illustrating an example embodiment of a mounting-frame-type patch panel assembly having a single-hinged front mounting frame that folds downward, and also illustrating example reduced-volume patch panel modules of FIGS. 3A-3C having two bend-insensitive fiber optic cables connected to the backside thereof.

FIG. 6 illustrates an example embodiment of patch panel assembly 150 wherein front mounting frame 210F is attached to back end 185 of cross member 182 via a hinge 224 that allows the front mounting frame to fold downward. This configuration provides access to interior mounting frame 210I and patch panel modules 50 supported thereby that reside immediately behind the front mounting frame. This configuration also provides for easy access to cables 70 (not shown) that connect to patch panel modules 50 mounted front mounting frame 210F. The example embodiments shown in FIG. 5 and FIG. 6 show one internal mounting frame 210I; two or more internal mounting frames can also be employed.

In an example embodiment, back panel 157 is hinged in the same manners as front mounting panel 210I in order to provide access to patch panel modules 50 mounted in the adjacent internal mounting frame 210I.

Figure 7:
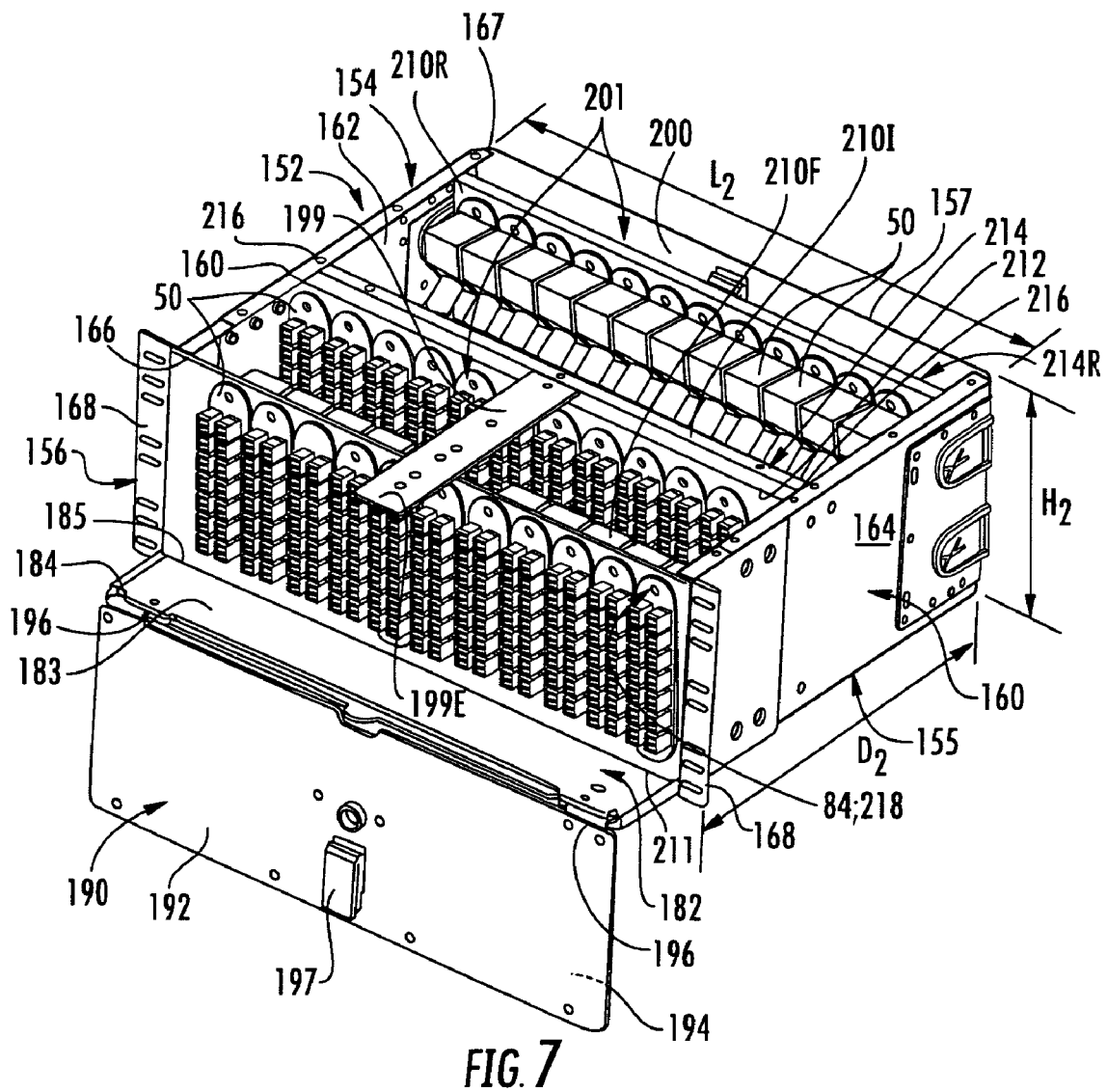
FIG. 7 is a perspective view of a mounting-frame-type patch panel assembly similar to that of FIG. 4, but illustrating an example embodiment wherein the back panel is in the form of a mounting frame that supports an array of rearward-facing reduced-volume patch panel modules.

FIG. 7 is a perspective view of an example patch panel assembly similar to that shown in FIG. 4, but illustrating an example embodiment wherein the back panel 157 is in the form of a rear mounting frame 210R having a rearward-facing mounting face 214R that supports one or more (e.g., from one to twelve) rearward-facing patch panel modules 50. In an example embodiment, rear mounting frame 210R is configured in one of the hinged configurations as front mounting frame 210F described above and also as described below.

In an example embodiment, mounting frames 210 are configured to support at least one patch panel module 50, and preferably is configured to support between 10 to 12 reduced-volume patch panel modules.

Hinge Assembly for Cable Routing

An aspect of the present invention is directed to routing cables 70 to and from mounting-frame-type patch panel assembly 150, as well as managing the distribution of cables (including cable fibers 12C) within the patch panel assembly.

Figure 8A:
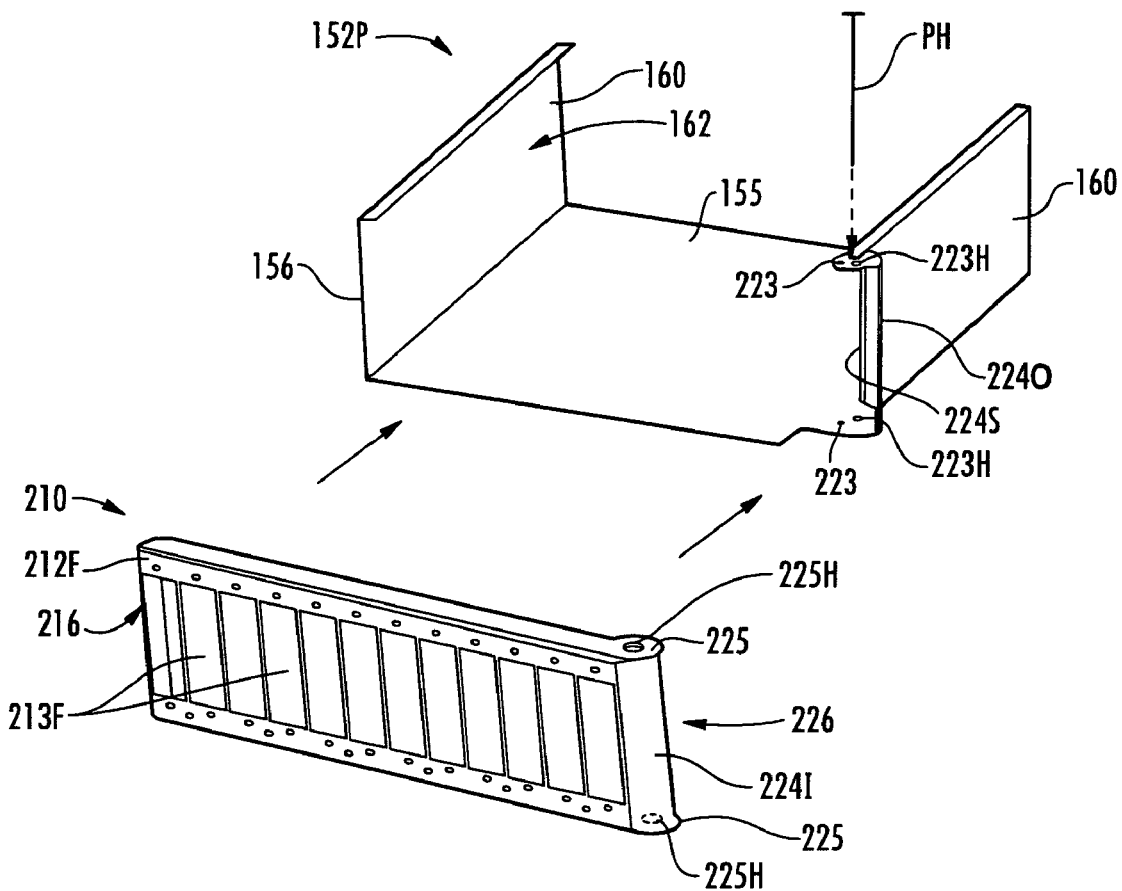
FIG. 8A is a perspective exploded view of an example embodiment of a front mounting frame and a housing portion that respectively include inner and outer curved hinge portions of a hinge assembly through which cables can be routed.

In an example embodiment, the routing of cables 70 and/or cable fibers 12C within housing interior region 200 and between patch panels 50 is facilitated by having a special hinge assembly 224 for front mounting frame 210F. FIG. 8A is a perspective exploded view of an example embodiment of front mounting frame 210F and a housing portion 152P. Front mounting frame 210F has a number of mounting apertures 213F in front face 212F for mounting patch panel modules 50. Front mounting frame 210F has a curved inner hinge portion 224I at one of the front mounting frame ends 216. Curved inner hinge portion 224I includes top and bottom surfaces 223 with vertically aligned holes 223H formed therein.

Housing portion 152P includes a curved outer hinge portion 224O configured to partially surround curved inner hinge portion 224I when front mounting frame 210F and housing portion 152P are connected. Curved outer hinge portion 224O includes top and bottom surfaces 215 with vertically aligned holes 225H formed therein.

Front mounting frame 210F and housing portion 152P are brought together so that curved inner portion 224I fits within curved outer portion 224O and so that holes 223H and 225H are aligned. A hinge pin PH is then passed through aligned holes 223H and 225H to operably fix curved inner and outer hinge portions 224I and 224O in place to form hinge assembly 224, wherein the curved inner hinge portion rotates within the curved outer hinge portion, while also serving to connect mounting frame 210F to housing portion 152P.

Figure 8B:
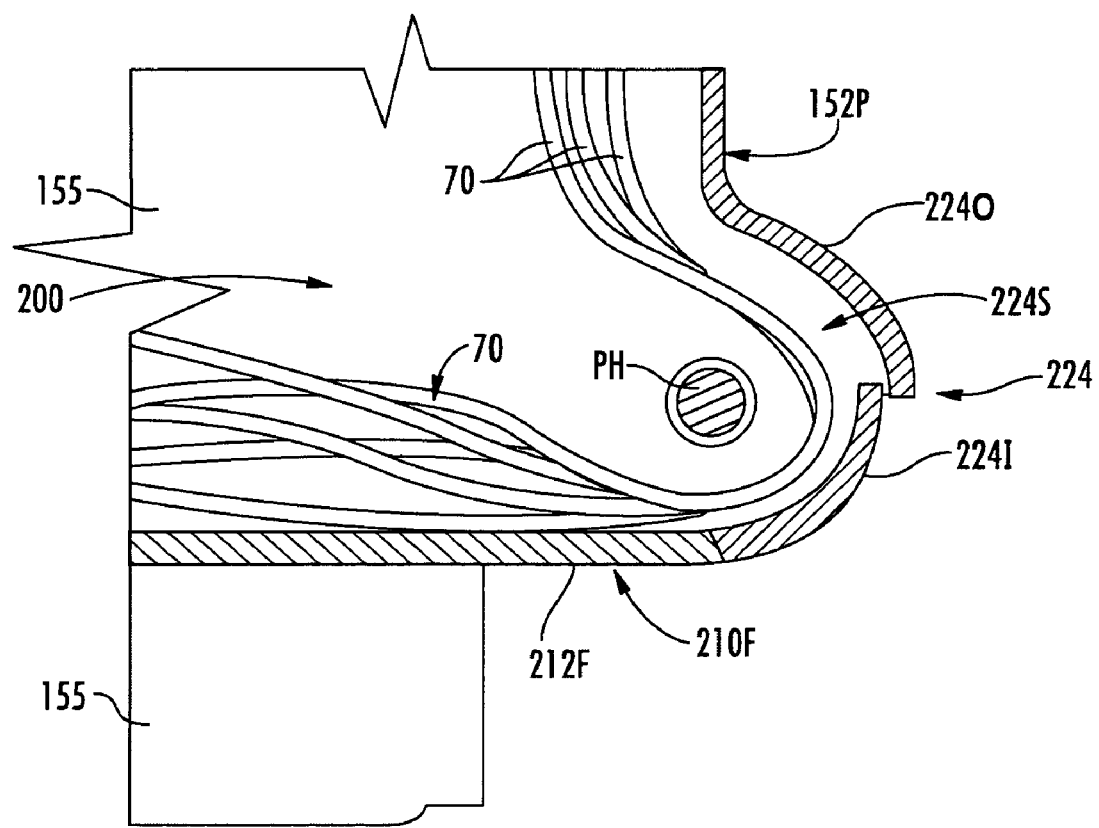
FIG. 8B is a close-up top-down cross-sectional view of an example embodiment of the hinge assembly as formed from inner and outer curved hinge portions of the front patch panel mounting frame and the housing portion of FIG. 8A.

FIG. 8B is a cross-sectional close-up view of an example embodiment of hinge assembly 224 as formed from curved inner and outer hinge portions 224I and 224O of FIG. 8A. The concave sides of curved inner and outer hinge portions 224I and 224O define a hinge interior space 224S that adds to housing interior region 200. Hinge interior space 224S serves as a conduit through which cables 70 pass when hinge assembly 224 is either in the closed position, as shown in FIG. 8B, or in the open position with front mounting frame 210F swung open. Hinge assembly 224 allows for opening and closing front mounting frame 210F without pinching the portions of cables 70 that pass through the hinge interior space 224S. In an example embodiment, hinge assembly 224 may include bushings (not shown) on surfaces 215 to facilitate the rotation of front mounting frame 210F. Hinge assembly 224 may also include a central cylindrical channel (not shown) that fits within the bushings and that accommodates hinge pin PH to facilitate smooth, reduced-friction operation of the hinge.

Cable Distribution Box

Figure 9A:
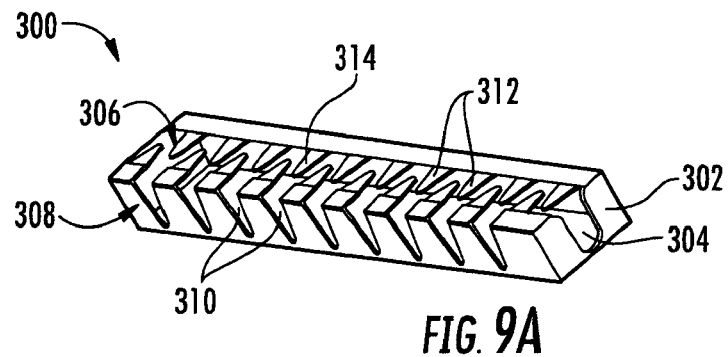
FIG. 9A is a perspective diagram of an example embodiment of a cable distribution box for guiding and/or storing bend-insensitive fiber optic cable.

FIG. 9A is a perspective diagram of an example embodiment of a cable distribution box or "stuff box" 300. Cable distribution box 300 is configured to receive cables 70 and distribute them to one or more patch panel modules 50, as described below. Cable distribution box 300 includes sides 302 having at least one aperture 304 formed therein and sized to pass a plurality of cables 70. Cable distribution box 300 also includes a substantially open top side 306, and front side 308 that has a plurality of V-shaped apertures 310 configured to align with corresponding patch panel modules 50. Cable distribution box 300 also includes an interior region or chamber 314 sized to accommodate multiple bend-insensitive fiber optic cables 70, including any slack therein.

In an example embodiment, open topside 306 includes inwardly extending flexible tabs 312 that serve to keep cable 70 from unwinding, while providing easy access to the portion of the cable wound and stored within interior region 314. In an example embodiment, cable distribution box 300 is made from polymer, plastic or sheet metal.

Figure 9B:
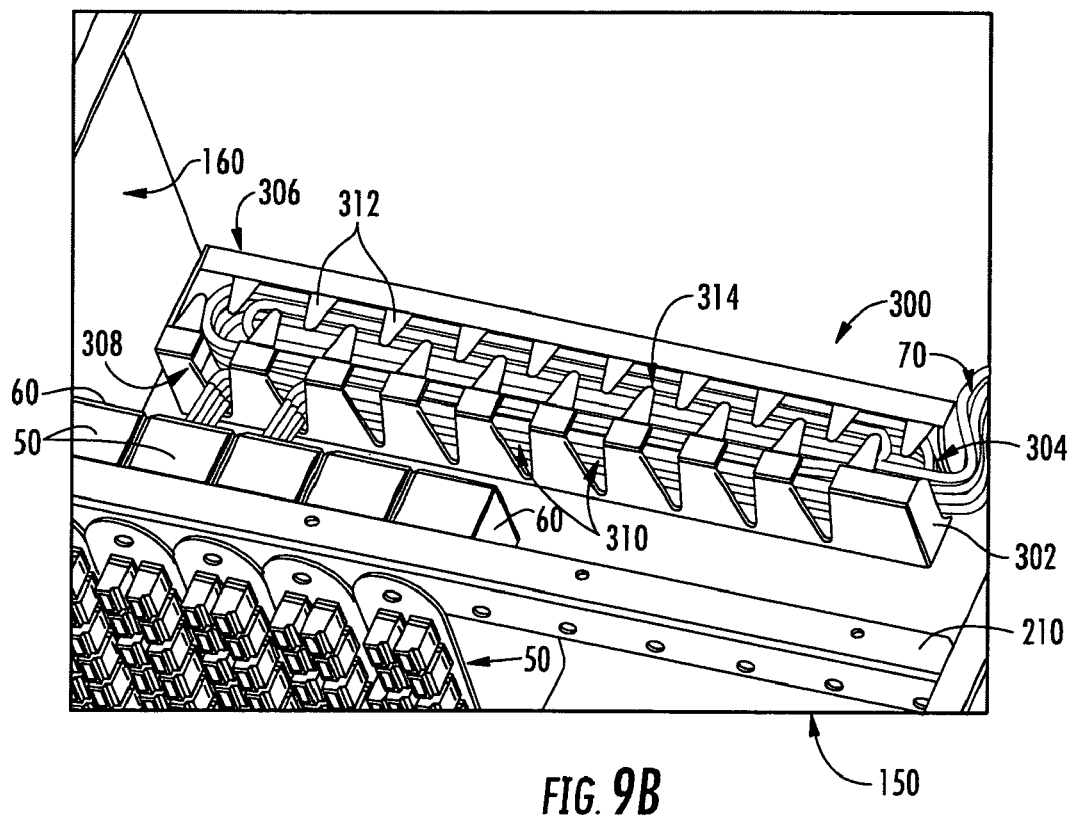
FIG. 9B is a perspective close-up view of an example cable distribution box FIG. 9A as arranged in a patch panel assembly behind a patch panel mounting frame.

FIG. 9B is a perspective close-up view of an example cable distribution box 300 as arranged in patch panel assembly 150 behind a mounting frame 210 that supports patch panel modules 50. Multiple cables 70 are shown entering chamber 314 via aperture 304 in side 302, with a portion of the cables stored in looped fashion within the interior region. Some of cables 70 are shown exiting cable distribution box 300 through two of the front apertures 310 so that they can be connected to the backside 60 of the adjacent two patch panel modules 50. In an example embodiment, cable distribution box 300 is secured to patch panel assembly 150, e.g., at bottom 155 or to one of sidewalls 160.

Figure 9C:
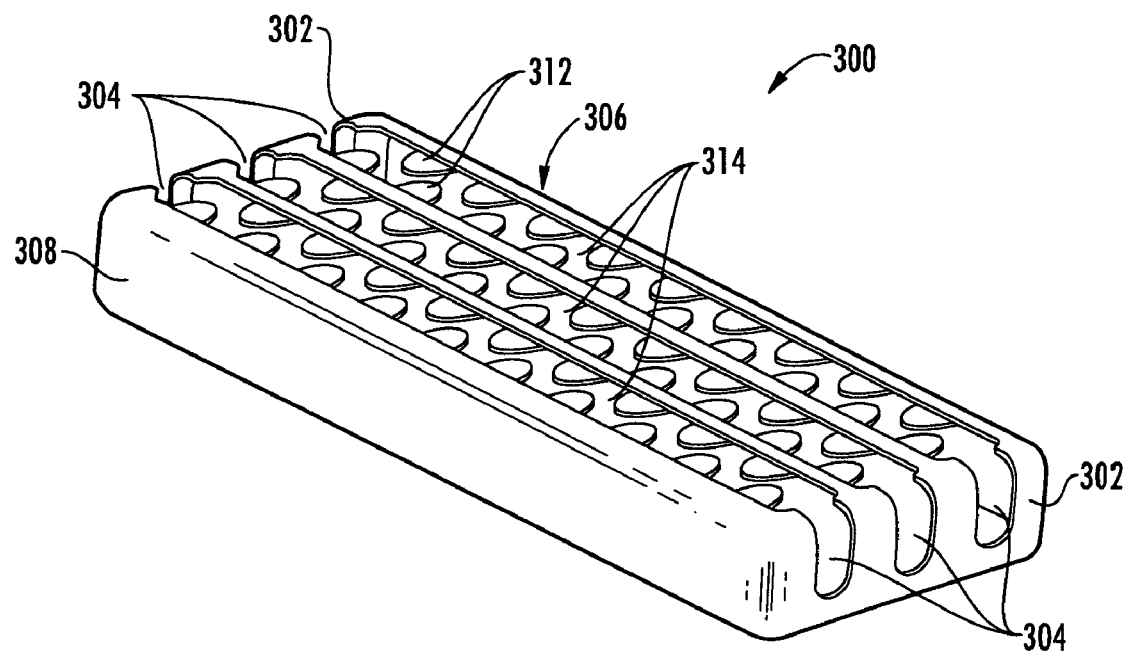
FIG. 9C is a perspective diagram of an example embodiment of a cable distribution box similar to that of FIG. 9A, but where the box has multiple chambers, no front apertures and two end apertures per chamber.

FIG. 9C is a perspective diagram of an example embodiment of a cable distribution box 300 similar to that of FIG. 9A, except that the box has multiple chambers 314 and no front apertures 310, and two end apertures 304 per chamber.

Patch Panel Assembly with Hinge Assembly and Cable Distribution Box

Figure 10A:
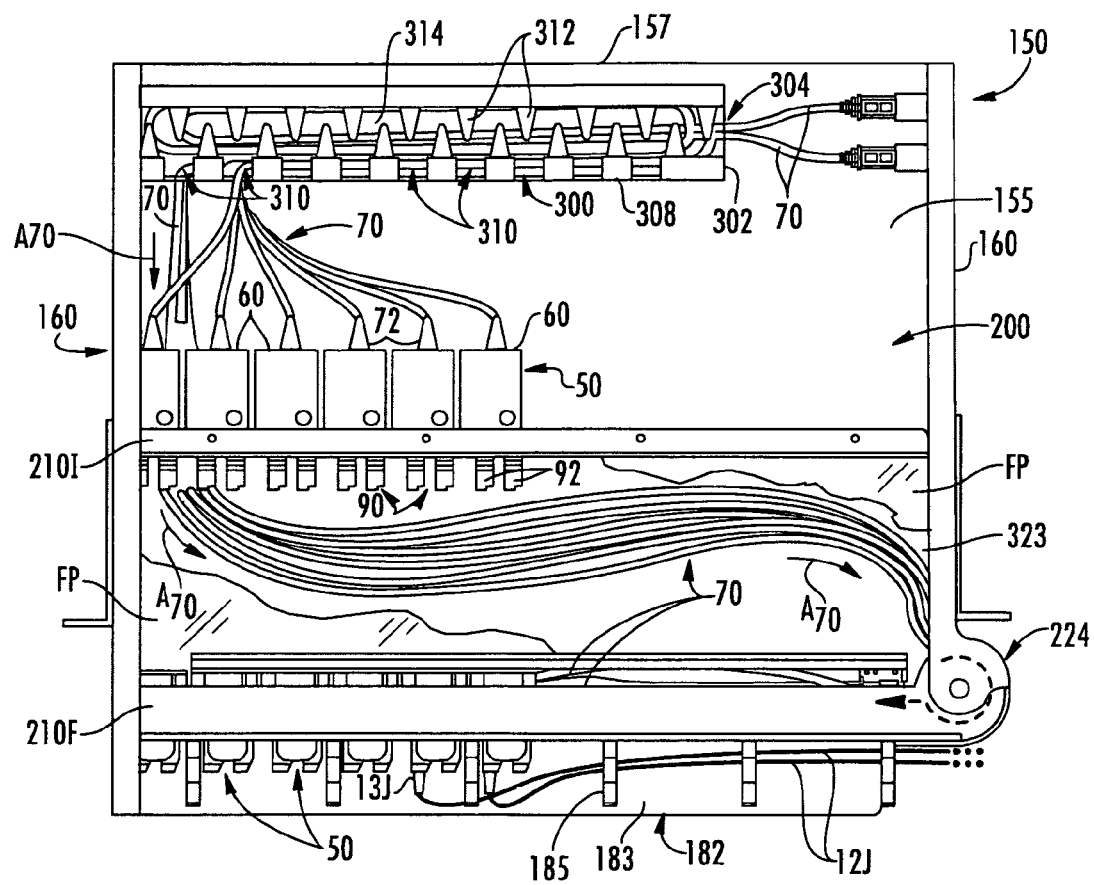
FIG. 10A is a plan view of an example embodiment of a mounting-frame-type patch panel assembly that includes the hinge assembly shown in FIG. 8B as well as the cable distribution box as shown in FIG. 9A.

FIG. 10A is a plan view of an example embodiment of mounting-frame-type patch panel assembly 150 that includes hinge assembly 224 of FIG. 8B as well as cable distribution box 300 of FIG. 9A arranged adjacent back wall 157. Patch panel assembly 150 includes on shelf upper surface 183, one or more clips 187 configured to guide and/or hold one or more cable fibers 12C or jump cables 12J onto the shelf surface (jump cables 12J are shown for illustration).

Some of cables 70 having portions thereof stored in cable distribution box 300 are connected to patch panel modules 50 of internal mounting frame 210I at respective patch panel module backsides 60. As indicated by arrows $A_{70}$, other cables 70 are routed beneath internal mounting frame 210I along bottom 155 and through hinge assembly 224 and to the backsides 60 of patch panel modules 50 mounted in front mounting frame 210F. In an example embodiment, a floor panel FP is arranged adjacent bottom panel 155 and creates a "false floor" that defines a sub-region 323 to interior 200 sized to accommodate the routing of one or more cables 70.

Figure 10B:
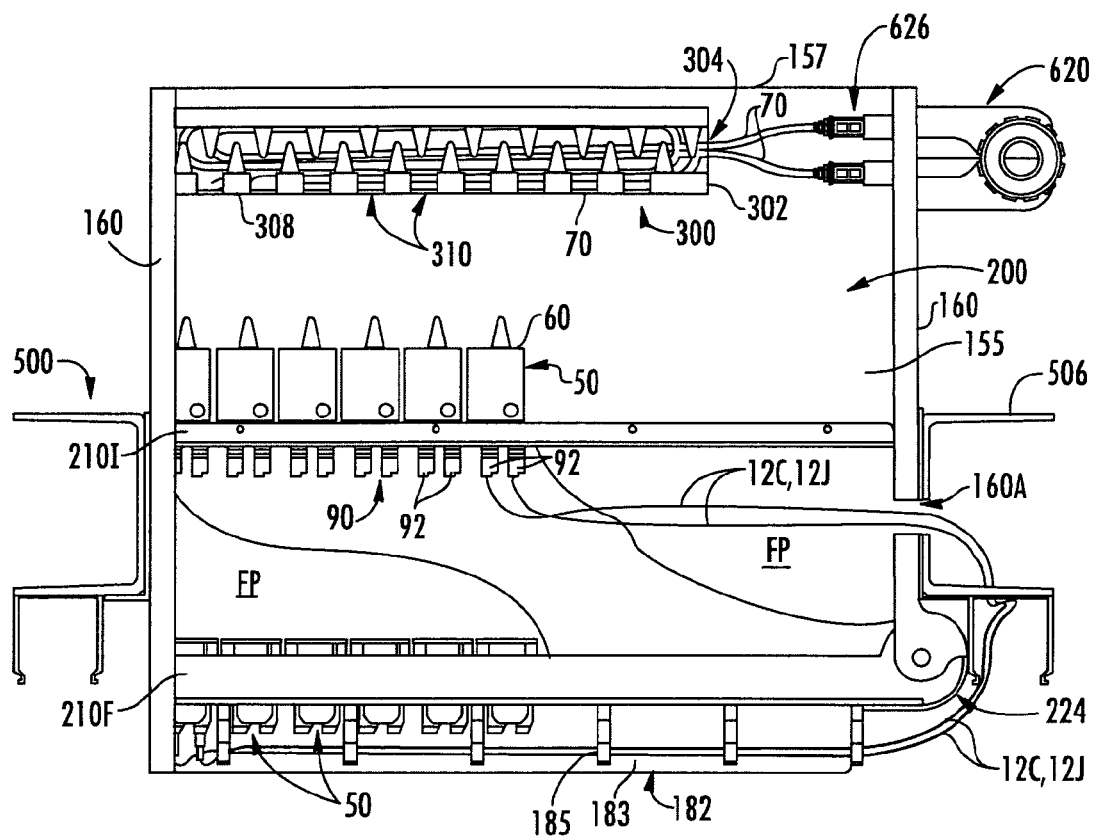
FIG. 10B is a plan view of the mounting-frame-type patch panel assembly of FIG. 10A and illustrates an example embodiment of how the cable fibers are routed from the rack frame to patch panel modules to the front mounting frame.

FIG. 10B is a plan view similar to FIG. 10A and illustrates an example embodiment of how cable fibers 12C (or jump fibers 12J) are routed from a rack frame 506 that supports patch panel assembly 150 to ports 90 on patch panel modules 50 on front mounting frame 210F and internal mounting frame 210I. As discussed above in connection with FIG. 10A, some of cable fibers 12C or jump fibers 12J are held on shelf upper surface 183 using one or more clips 187. Sidewall 160 includes an aperture 160A formed therein that allows for cable fibers 12C from a main (e.g., trunk) cable (not shown; see FIGS. 18A-18C) to be routed into interior region 200 from rack frame 506.

Drawer-Type Patch Panel Assembly

Figure 11A:
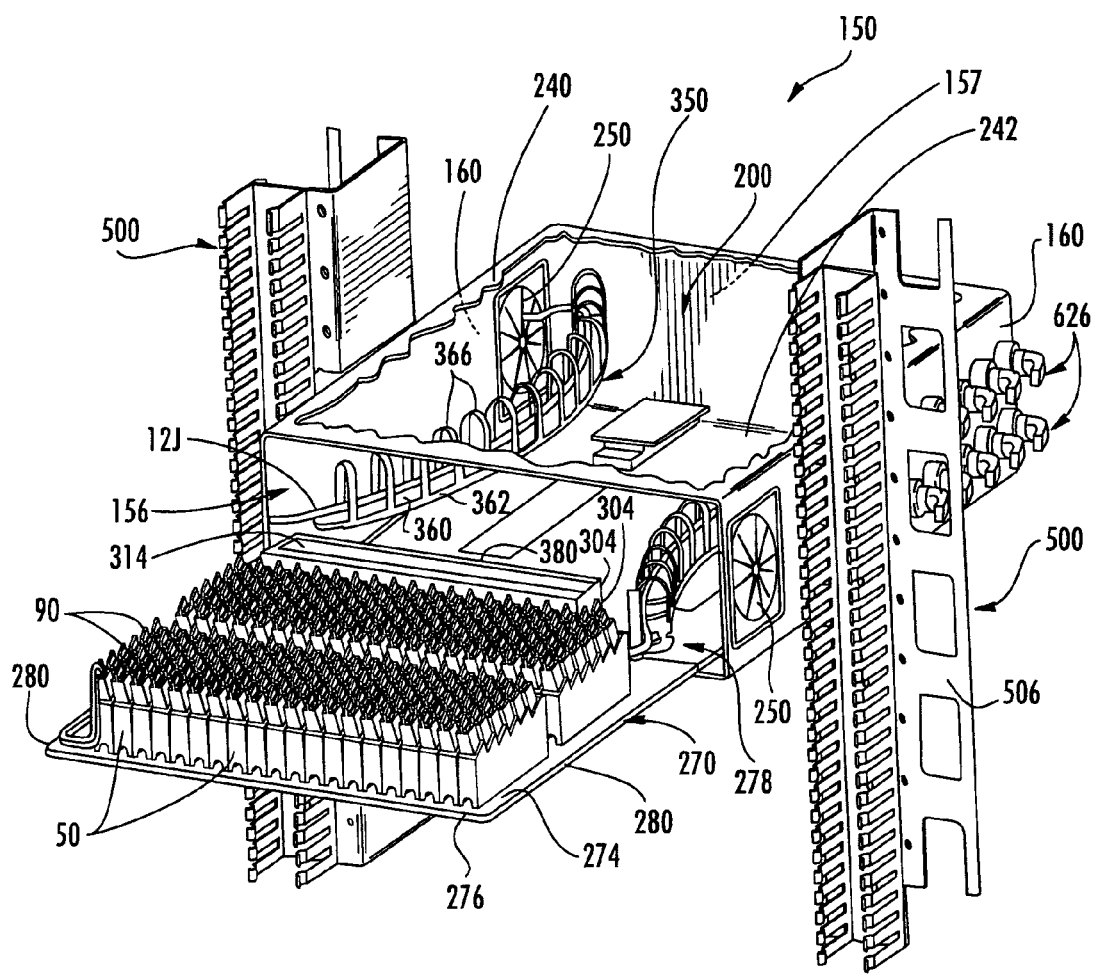
FIG. 11A is a front perspective cut-away view of an example embodiment of drawer-type patch assembly that includes a drawer configured to hold patch panel modules horizontally with the jacks facing upward at an angle.
Figure 11B:
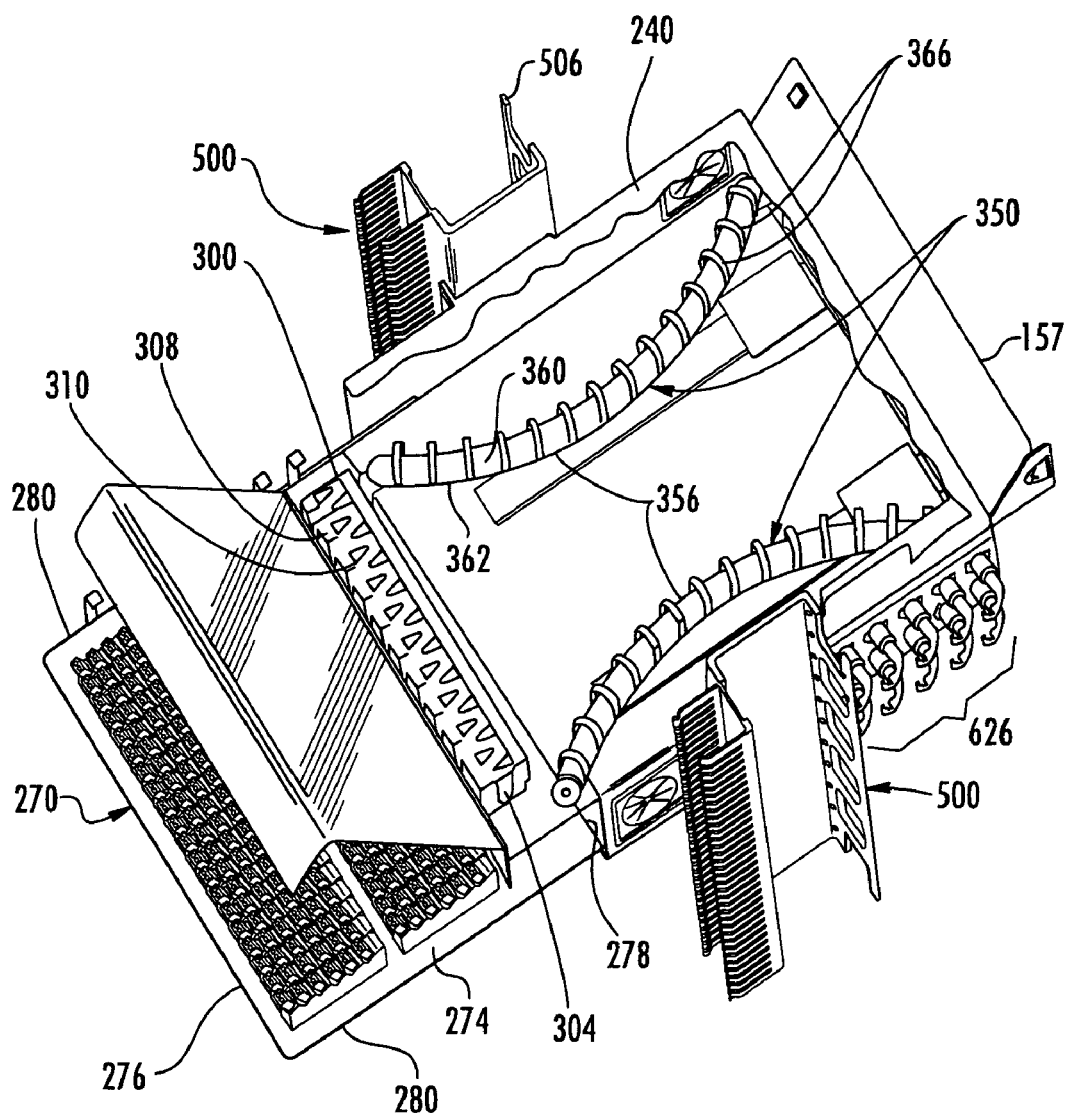
FIG. 11B is a top-down front perspective view similar to that of FIG. 11A.
Figure 11C:
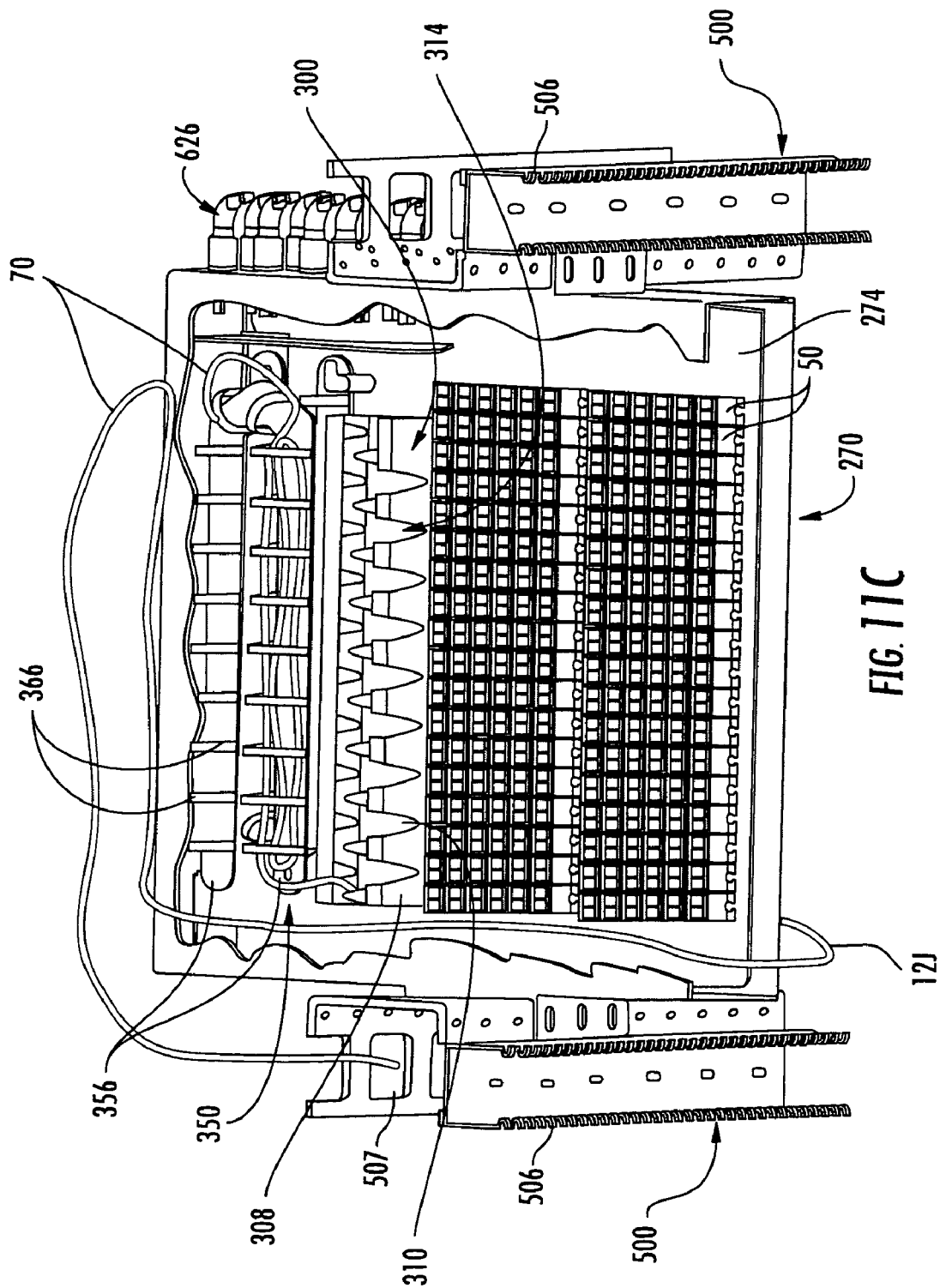
FIG. 11C is a top-down view of the drawer-type patch panel assembly of FIG. 11A, showing the drawer open and fiber optic cabling routed therein.
Figure 11D:
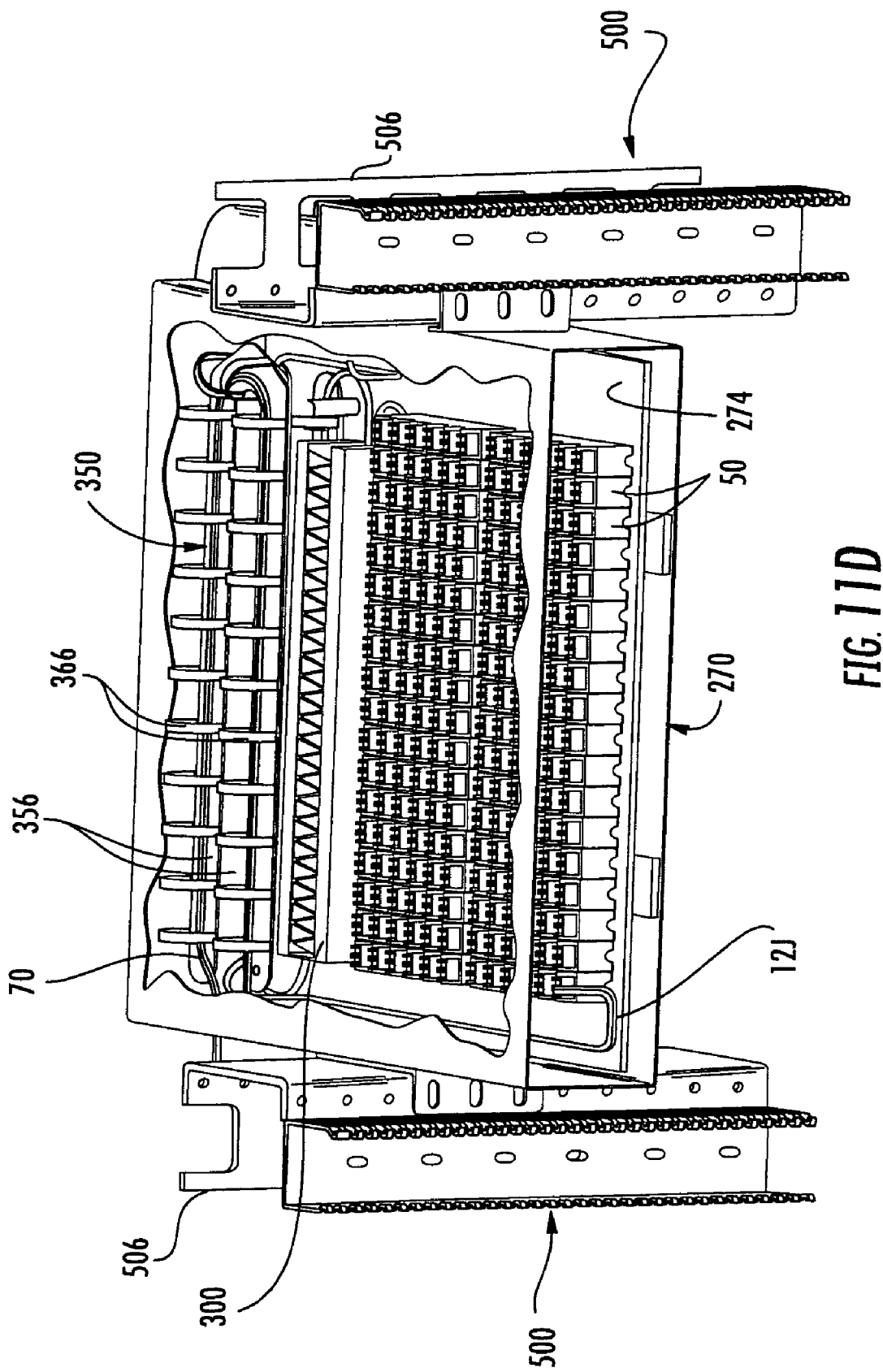
FIG. 11D is similar to FIG. 11A but shows the drawer as closed and within the assembly housing.

FIGS. 11A through 11D are top-down perspective cut-away views of an example embodiment of patch panel "drawer" assembly 150 held in a rack assembly 500. Patch panel assembly 150 includes a drawer 270 configured to hold one or more patch panel modules 50 in a high-density, substantially horizontal configuration, with jacks 90 facing upward but preferably angled toward the front of the drawer. FIGS. 11A through 11C shows drawer 270 pulled out from housing 152, while FIG. 11D shows the drawer slid into the housing.

Housing 152 of patch panel assembly 150 includes a top panel 240, a bottom panel 242, and is open at front 156. One or both sidewalls 160 include one or more apertures 250 sized to pass one or more bend-insensitive cable fibers 12C. One or both sidewalls 160 also includes one or more apertures 256 sized to pass one or more jumper fibers 12J, as explained in greater detail below. Housing 152 has dimensions of length $L_3$=17 inches (~10U), width $H_3$=3.5 inches (2U) and depth $D_3$=16.1 inches (~9U) (see FIG. 12).

With continuing reference to FIGS. 11A through 11D, drawer 270 is configured to clearance fit within interior 200 and to slide in and out thereof over bottom panel 242. In an example embodiment, drawer 270 has a floor panel 274 with a front end 276, a back end 278, and opposite side edges 280. Floor panel 274 supports an array of reduced-volume patch panel modules 50 arranged in one or more rows and in a horizontal configuration with jacks 90 pointing upward at an angle towards the front of drawer 270. Here, drawer 270 obviates the need for vertically oriented module frames 210 as described above. Example patch panel modules 50 suitable for use in this configuration are discussed in greater detail below. Note that the backside walls 60 of the patch panel modules 50 are face-down on floor panel 274.

In an example embodiment, each patch panel module 50 includes six jacks 90 each having one or two ports 92. Further in an example embodiment as shown in FIG. 11D, the array of patch panel modules 50 is made up of two rows of eighteen modules, for a total of 36 modules and thus 216 jacks 90 and thus 216 or 432 ports 92, depending on whether the jacks are single or dual port. Thus, in an example embodiment, the drawer-type patch panel assembly 150 provides between 216 ports/U and 216 ports/U. Jacks 90 arranged on patch panel modules 50 at an angle relative to vertical and angled toward the front of drawer 270.

In an example embodiment, housing assembly 150 further includes a cable distribution box 300 arranged near the back end 278 of floor panel 274 behind patch panel modules 50. As discussed above, cable distribution box 300 is configured to receive bend-insensitive fiber optic cables 70 and store a portion of them while distributing them to patch panel modules 50.

In an example embodiment best illustrated in FIG. 11B, housing bottom panel 242 includes at least one cable guide 350 configured to guide cables 70 that enter housing interior 200 from housing apertures 250. In an example embodiment, cable guide 350 includes at least one guide member 356. In an example embodiment, guide member 356 includes tray section 360 with sides 362. Guide member 356 may also include a number of spaced apart containment members 366 connected to respective sides so as to form an open tunnel-like channel 360 that contains one or more of cables 70. One end of guide member 356 is located at or near aperture 250, while the other end is located at back end 278 of drawer floor panel 274.

In an example embodiment, cable guide 350 includes two articulated and curved guide members 356 that fold in and reside at housing back panel 157 in a stacked fashion when drawer 270 is closed, and that fold out and reside near housing sidewalls 160 when the drawer is opened. This folding action serves to control the distribution and bending of {fiber optic cables} being held within guide members 356. In an example embodiment, one guide member 356 is arranged at a different (e.g., lower) height than the other so that the lower guide member passes underneath the higher guide member when the two are folded together, as shown in FIG. 11D.

Figure 12:
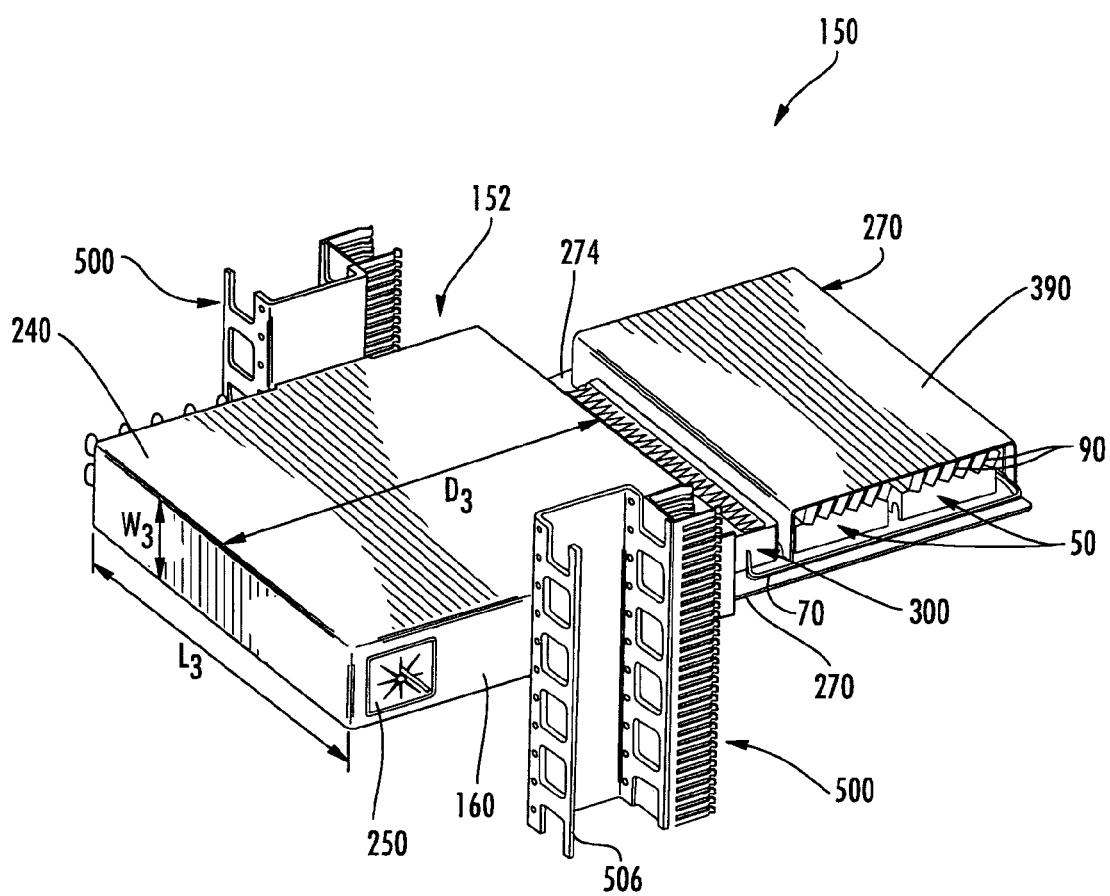
FIG. 12 is a rear perspective view of the drawer-type patch panel assembly similar to FIG. 11A, and that includes a patch panel module cover.

FIG. 12 is a rear perspective view of patch panel assembly 150, wherein the assembly includes a drawer cover 390 that covers patch panel modules 50, wherein the drawer is shown in the open position. Also shown in FIG. 12 are the dimensions $L_3$, $H_3$ and $D_3$ for housing 152.

Patch Panel Module for Drawer-Type Patch Panel Assembly

Figure 13A:
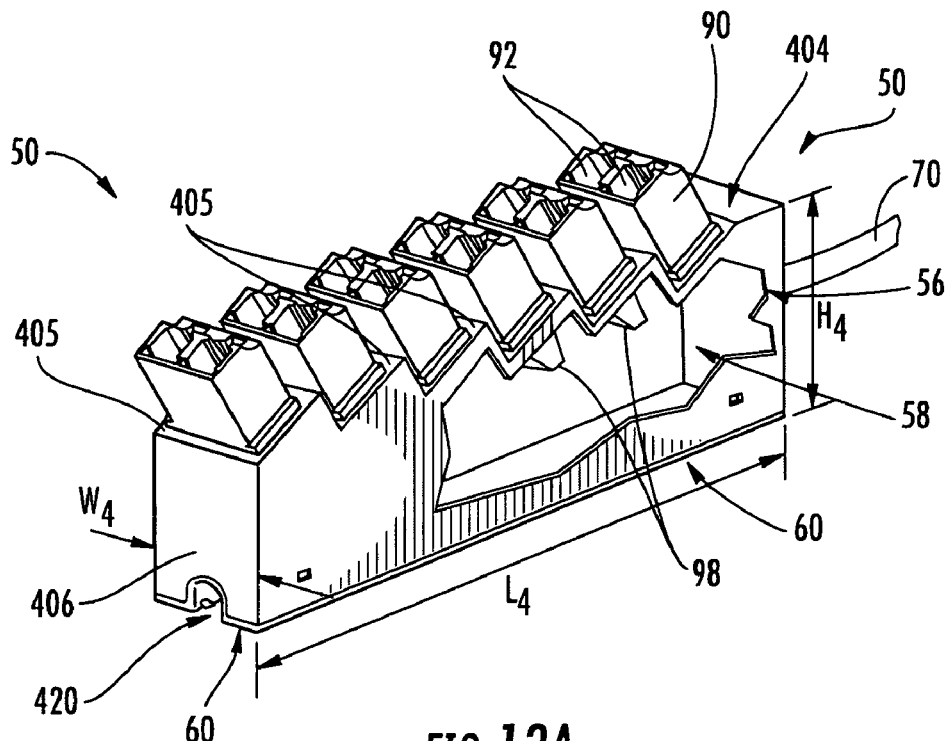
FIG. 13A through FIG. 13C are close-up perspective views of an example embodiment of a patch panel module for use in a drawer-type patch panel assembly, wherein the patch panel module includes an underside channel for cable routing.
Figure 13B:
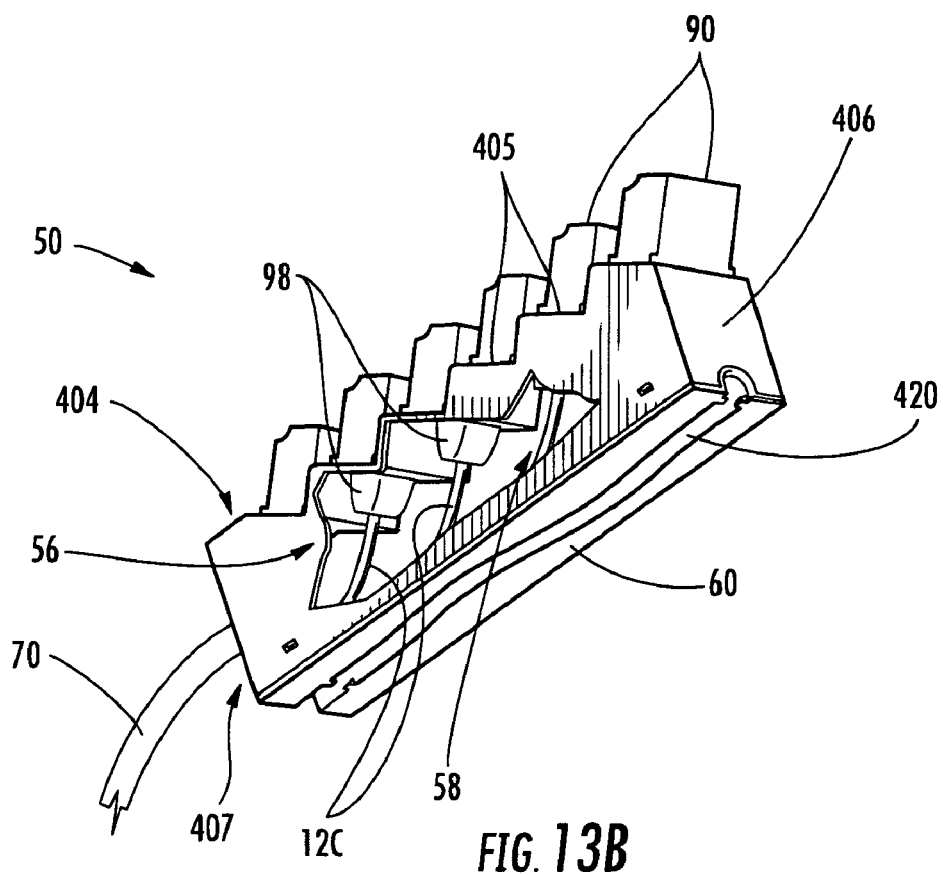

FIGS. 13A and 13B are perspective diagrams of an example embodiment of a patch panel module 50 suitable for use in the drawer-type patch panel assembly 150 of FIGS. 11A through 11D. Like patch panel module 50 of FIGS. 3A through 3B discussed above, the patch panel module 50 of the present example embodiment include housing 56, backside 60 and jacks 90 with ports 92. However, in an example embodiment, the dimensions of housing 56 of length $L_4=4$ inches, width $W_4=0.67$ inches and depth $H_4$ between about 0.75" and 1.25" and preferably about 1 inch (e.g., 1.06 inches). Patch panel module 50 of FIGS. 11A through 11D also have "reduced form factor."

Patch panel module 50 of the present example embodiment has a front 404 with angled facets 405, and ends 406 and 407. Note that each jack 90 is arranged on an angled facet 405 and are angled away from end 407. FIG. 13B shows cable fibers 12C from bend-insensitive fiber optic cable 70 attached to backside ports 98 of jacks 90.

Figure 13C:
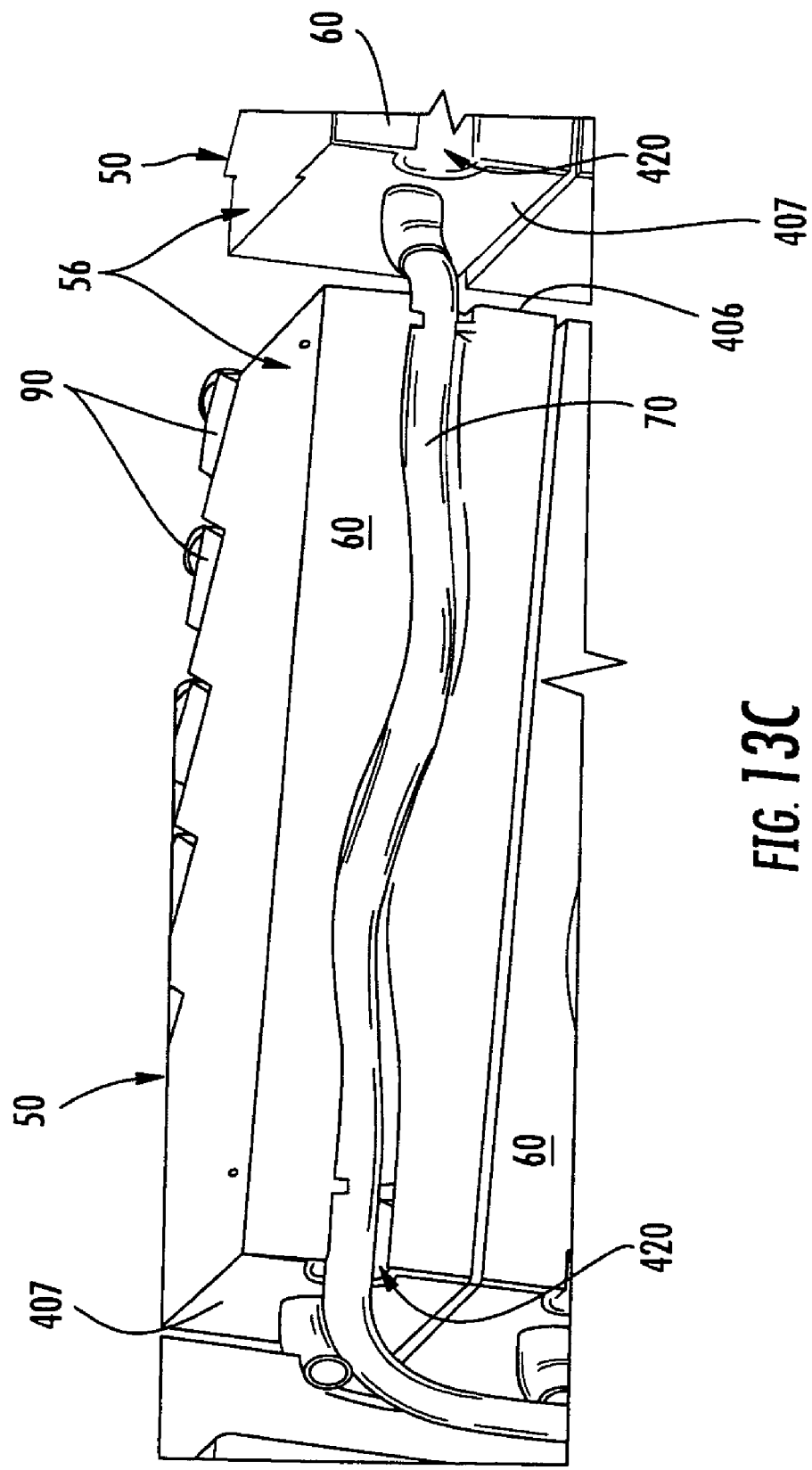

Patch panel module includes an open channel 420 formed in backside wall 60 and sized to accommodate cable 70 when patch-panel module 50 is placed with backside 60 against floor panel 274. FIG. 13C is a view of backside 60 of patch panel module 50 as would be seen by looking through floor panel 274 if the floor panel were transparent. Note that the cable 70 that attaches to patch panel module 50 of FIGS. 13A and 13B does so via end 407 of housing 56.

Figure 14:
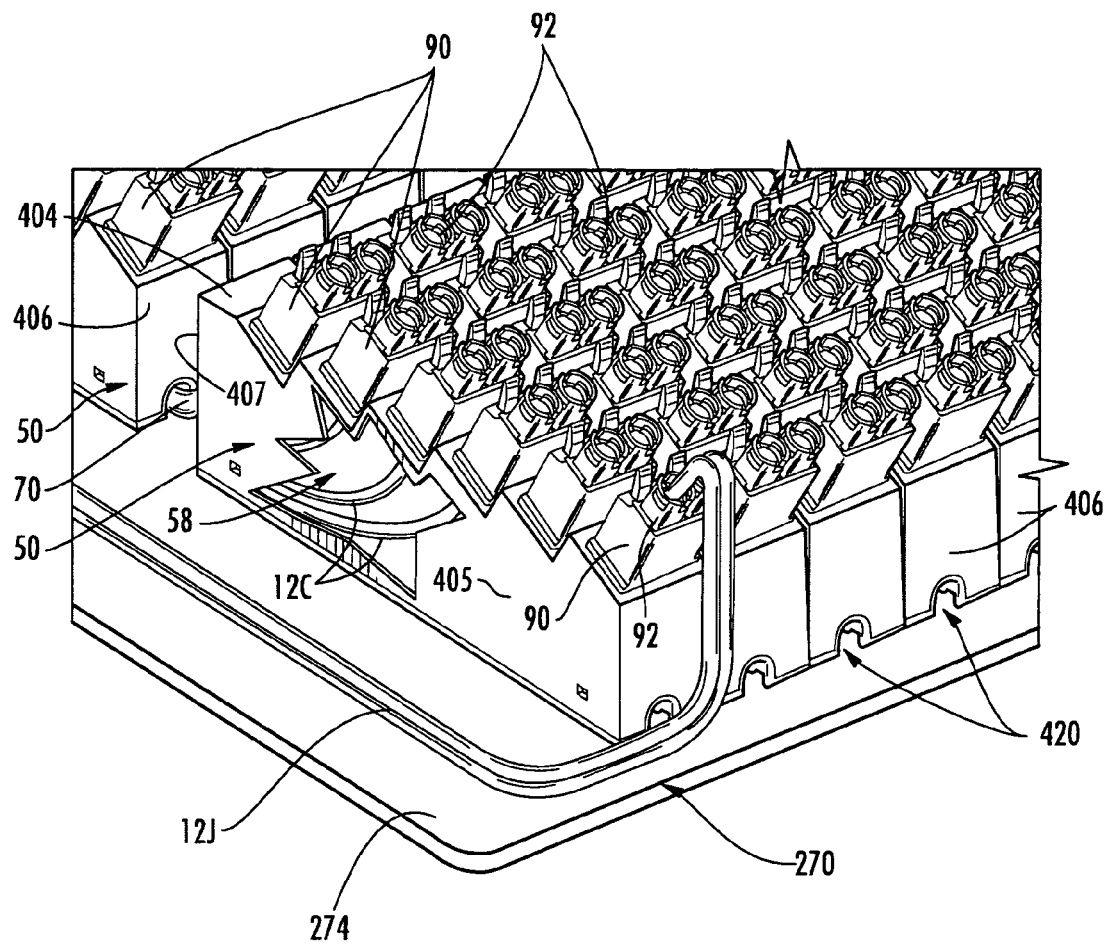
FIG. 14 is a close-up view of the array of patch panel modules of FIGS. 13A-13C as supported by the drawer floor panel in the drawer-type patch panel assembly, and showing a jumper cable connected to one of the module jacks.

FIG. 14 is a close-up view of an array of patch panel modules 50 of FIG. 13A as arranged on drawer floor panel 274. A jumper fiber 12J is shown connected to one of jacks 90. Cable 70 is also shown passing under one of the back-row patch panel modules 50 via channel 420 to the corresponding end 407 of the front row patch panel module. Cable fibers 12C from cable 70 are shown within one of the patch panel modules and connected to backside ports 98 of jacks 90 (see FIG. 13B).

Figure 15A:
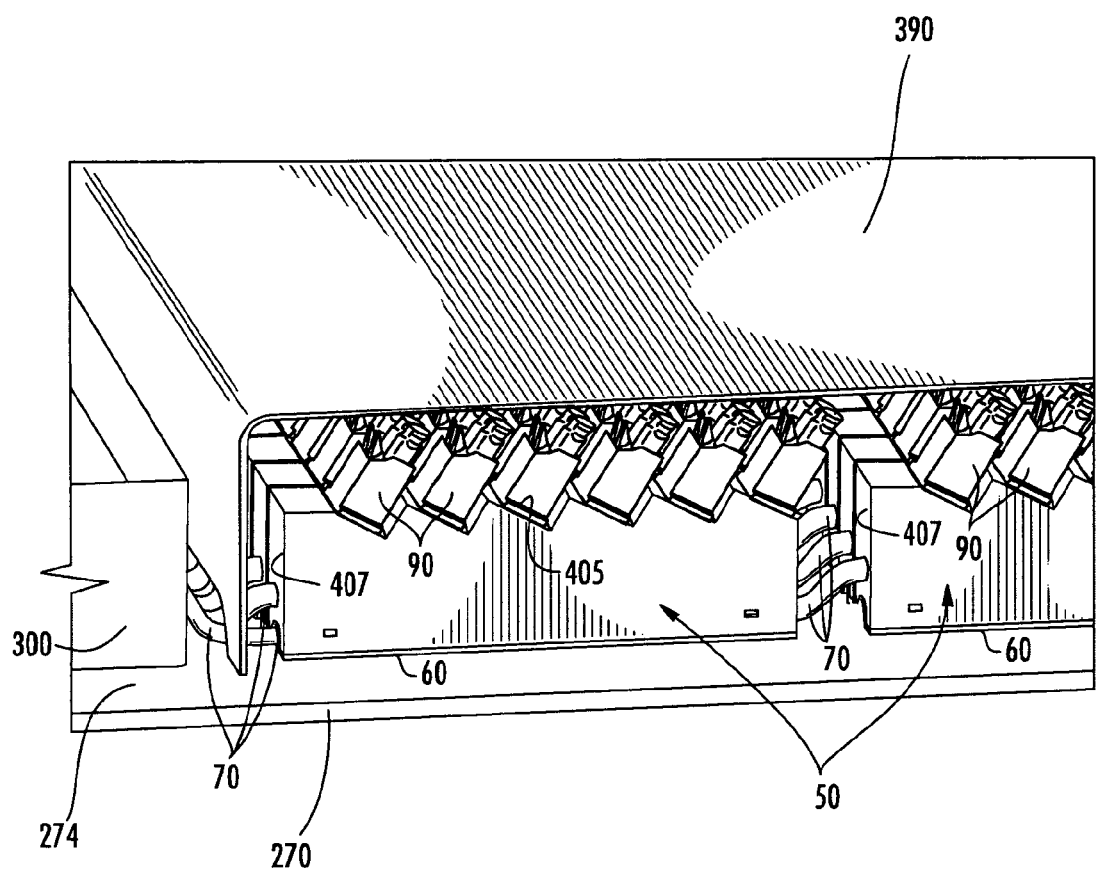
FIG. 15A is a side close-up view of the patch panel modules as mounted in the drawer such as shown in FIG. 12, illustrating how the cable fibers are routed to the different patch panel modules via the underside channels.

FIG. 15A is close-up side view of drawer 270 and the array of patch panel modules 50 of FIG. 13A, showing in more detail how cables 70 passes from cable distribution box 300 and underneath the back-row patch panel modules 50 to the front-row patch panel modules. Other cables 70 are attached directly to the back-row patch panel modules 50 at respective housing ends 407.

Figure 15B:
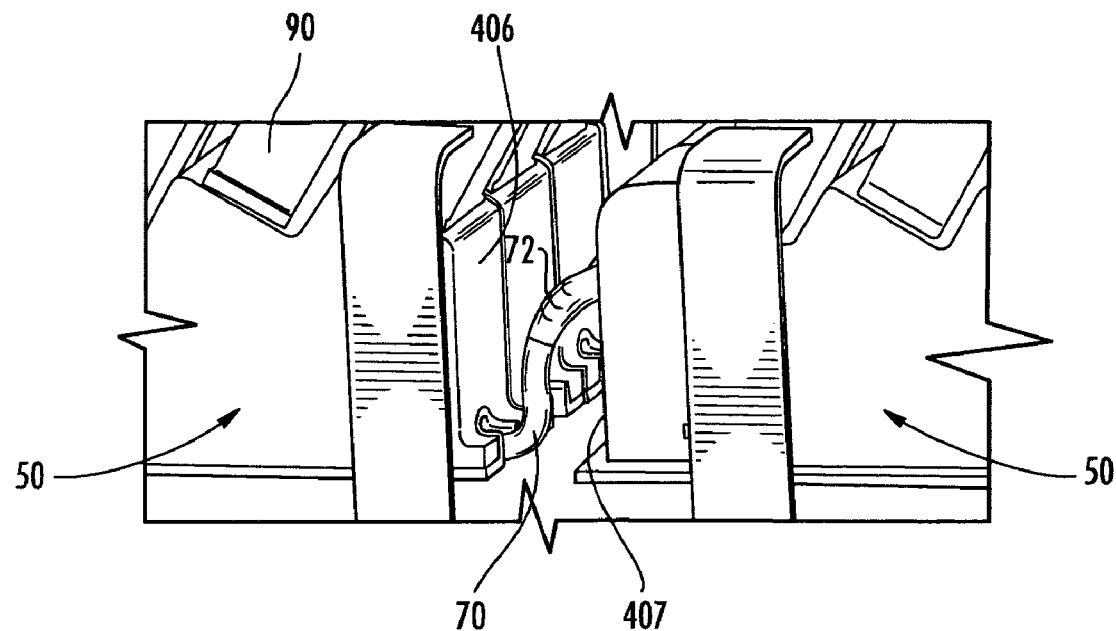
FIG. 15B is a close-up view of adjacent front-row and back-row patch panel modules of FIG. 15A, illustrating how a cable fiber passes through the underside channel in the back-row module to be connected to the front-row module.
Figure 15C:
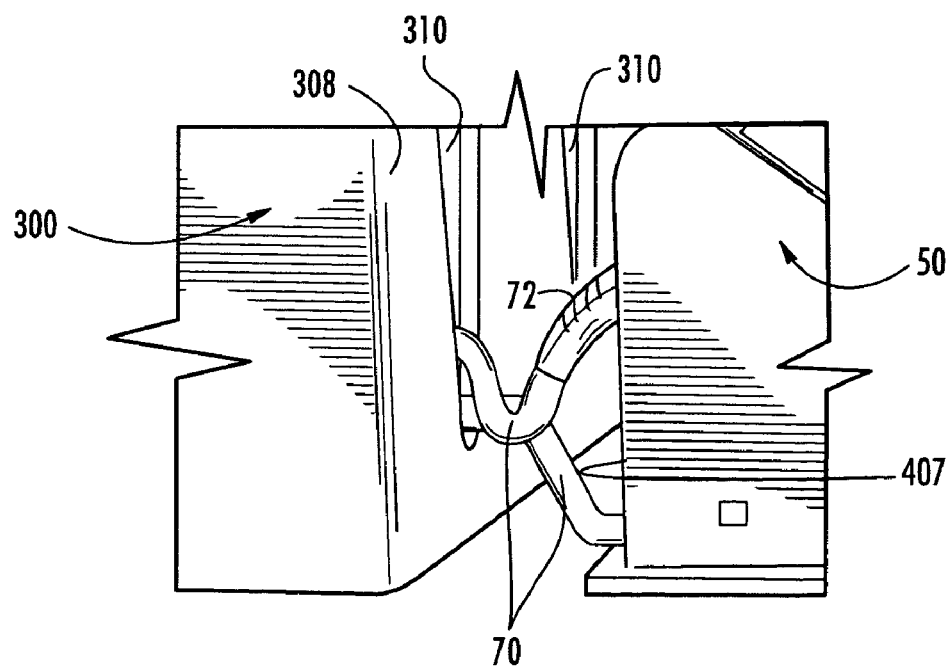
FIG. 15C is a close-up view of a back-row patch panel module and the adjacent cable distribution box of FIG. 15A, illustrating how a cable fiber passes from the cable distribution box to the adjacent patch panel module.

FIG. 15B is close-up view of adjacent back-row and front-row patch panel modules 50, while FIG. 15C is a close-up view of the back-row patch panel modules 50 and cable distribution box 300. These Figures illustrate the routing of respective cables 70 to a back row and a front row patch panel module 50. In FIG. 15B, cable 70 is routed through channel 420 and emerges at side 406. This cable 70 is then connected to the adjacent patch panel module 50 at side 407. In FIG. 15C, cable 70 emerges from an aperture 310 in cable distribution box 300 and is connected to end 407 of the adjacent patch panel module 50, while another cable 70 from aperture 310 is routed through channel 420 of the same patch panel module 50.

Rack Assembly

Aspects of the invention includes a rack assembly that houses either the drawer-type patch panel assemblies or mounting-frame-type patch panel assemblies described above. Because both of these types of patch panel assemblies 150 preferably have a standard 4U configuration, both can be housed in the same rack assembly.

Figure 16:
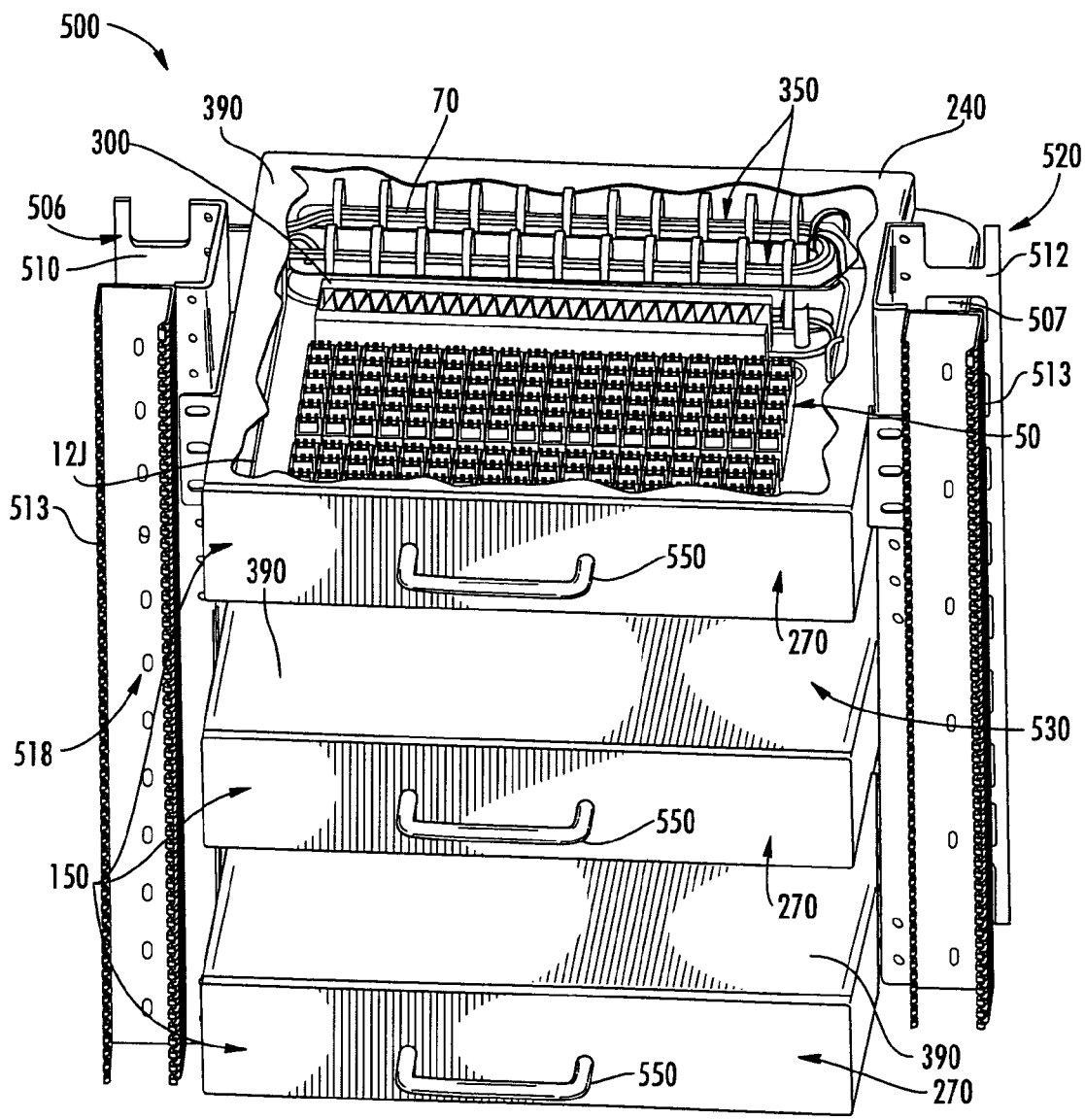
FIG. 16 is a front perspective view of a number of drawer-type patch panel assemblies held in an equipment rack in a stacked manner.

FIG. 16 is a front perspective view of an example embodiment of a rack assembly 500 that houses a number of drawer-type patch panel assemblies 150 in a stacked fashion. Rack assembly 500 includes rack frame 506 having vertical side bars 510 and 512, and a top horizontal cross-bar (not shown) that connects the side bars at the top of the frame. Vertical side bars 510 and 512 preferably have apertures 507 formed therein and sized to facilitate cable routing within frame 506. Frame 506 has a front side 518 and a backside 520. Frame 506 includes a flat base (not shown) to which side bars 510 and 512 are attached, and which serves to provide standing support for the frame. Frame assembly optionally includes a cable guide 513 attached to one or both of vertical side bars 510 and 512 to facilitate the routing of cables within the frame assembly.

In a preferred embodiment, rack assembly 500 comprises a standard 19" equipment rack having an inside width of 17.75", on-center rail hole pairs separated by 18.3" on the front of the rack, and is divided up by standard 1.75" increments, where each increment is called a "unit" or "U" for short and includes three complete hole pairs. Frame 506 defines an interior region 530 within which patch panel assemblies 150 reside. Drawers 270 of the drawer-type patch panel assemblies 150 preferably include handles 550.

Figure 17:
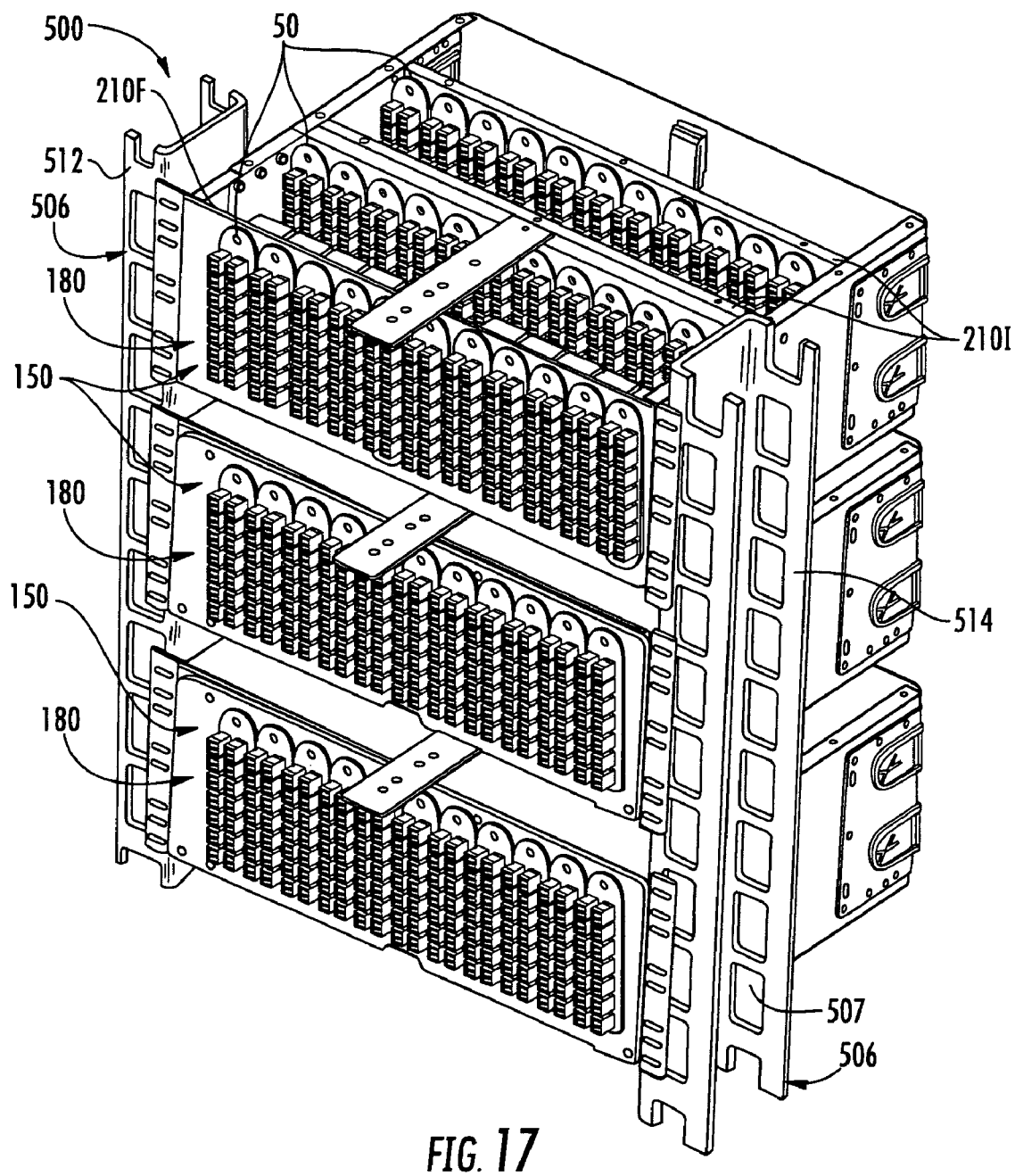
FIG. 17 is a front perspective view of a number of mounting-frame-type patch panel assemblies held in an equipment rack in a stacked manner.

FIG. 17 is a front perspective view an example embodiment of rack assembly 500 similar to that of FIG. 16, but showing a number of mounting-frame-type patch panel assemblies 150 housed in an equipment rack assembly 500 in a stacked manner.

The inside surface of side bars 510 and 512 are configure to allow for patch panel assemblies 150 to be arranged in a stacked manner between the side bars and thus within frame interior region 530, as shown. In one example embodiment, the inside surface of side bars 510 and 512 are smooth, while in another example embodiment they include guide tabs (not shown) that facilitate the stacking and support of housing assemblies 150 within frame 506. In an example embodiment, side bars 510 and 512 are configured so that front and back portions of the patch panel assemblies protrude from the front side 518 and backside 520 of frame 506, as illustrated in FIGS. 16 and 17.

Figure 18A:
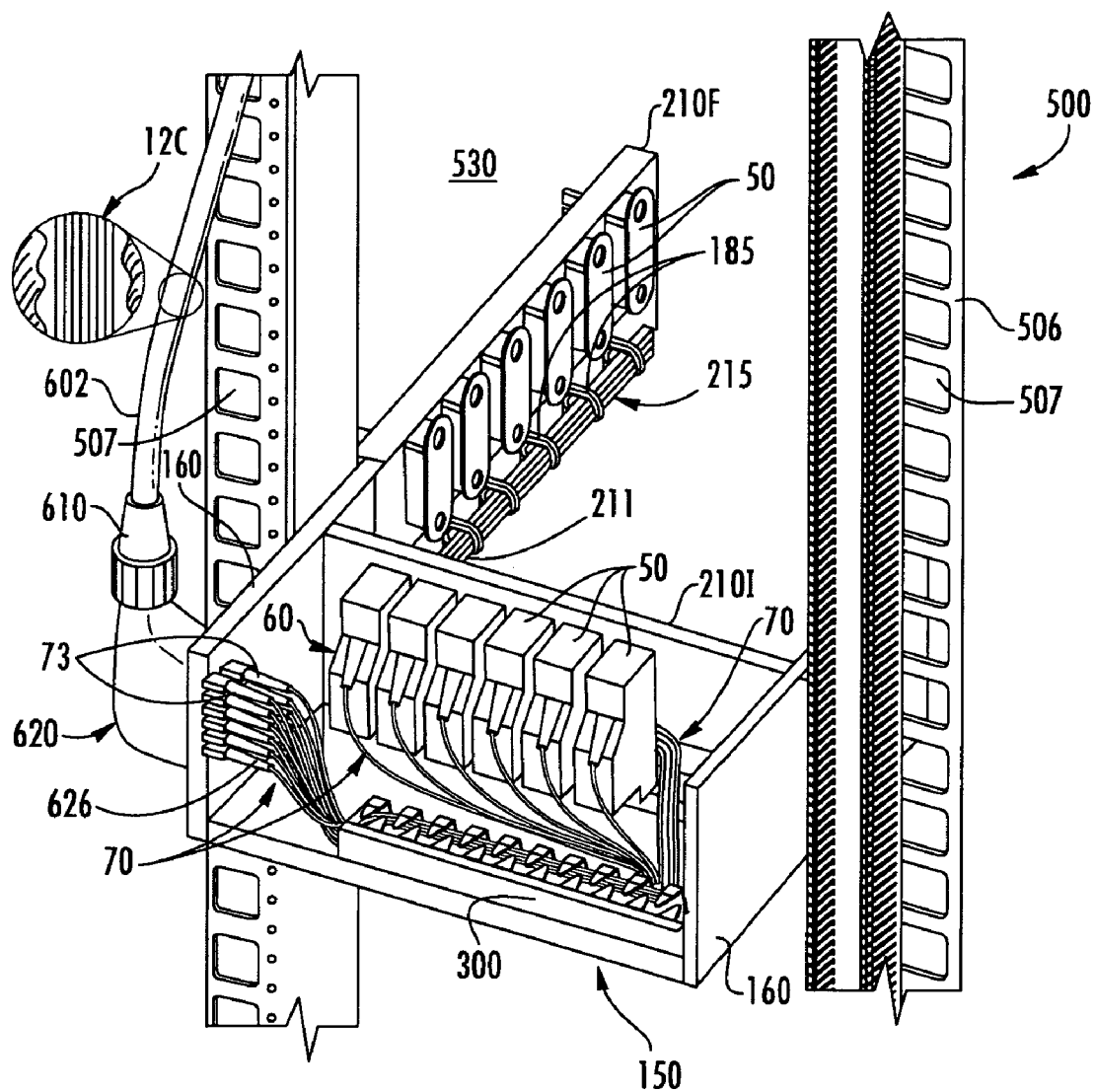
FIG. 18A is an elevated rear perspective view of an example embodiment of a portion of a rack assembly shown supporting a single mounting-frame-type patch panel assembly similar to that shown in FIG. 10A.

FIG. 18A is a elevated rear perspective view of an example embodiment of a portion of rack assembly 500 shown supporting a single mounting-frame-type patch panel assembly 150 similar to that shown in FIG. 10A. Rack assembly 500 includes a main (e.g., trunk) cable 602 that carries a plurality of optical fibers, such as cables 70. In an example embodiment, main cable 602 includes a boot 610 that leads to a fan-out section 620. Cables 70 in main cable 620 are then connected to a plurality of connector ports 626 at housing side 160. In this embodiment, "external" cables 70 are connected to "internal" cables 70 of patch panel assembly 150 at connector ports 626. Internal cables 70 are shown as having connectorized ends 73 for connecting to connector ports 626. Internal cables 70 are routed through cable distribution box 300. Some internal cables 70 are connected to backsides 60 of patch panel modules 50 mounted in an interior mounting frame 210I. Other internal cables are routed to patch panel modules on front mounting frame 210F, which is shown in the open position. In an example embodiment, front mounting frame 210F includes a guide shelf 215 that extends inwardly toward interior region 200 from bottom edge 211. Guide shelf 215 is configured to guide and/or hold cables 70 that are routed to patch panel modules 50 mounted in front mounting frame 210F. In an example embodiment, guide shelf 215 includes clips 185 that serve to guide and/or hold cables 70 on the guide shelf. It should be noted again that in FIG. 18B cables 70 and 12C can be the same type of cables, e.g., patch cables or jump cables (12J).

Figure 18B:
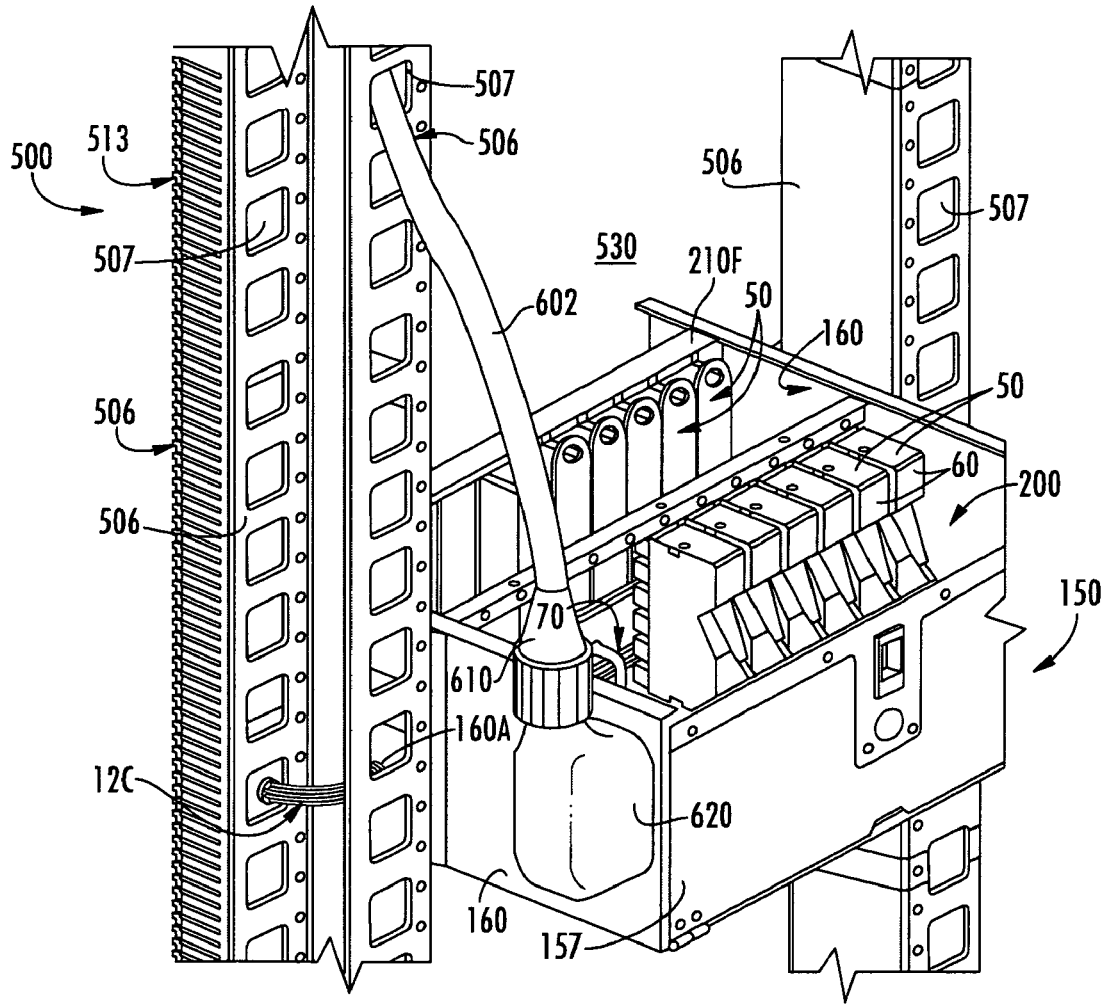
FIG. 18B is another elevated rear perspective view of the rack assembly of FIG. 18A, but from the opposite quarter and with the back panel in place.

FIG. 18B is another elevated rear perspective view of rack assembly 500 of FIG. 18A but from the opposite quarter and with back wall 157 in place. A bundle of cable fibers 12C (which could also be jump cables 12J) and main cable 602 are shown being routed through apertures 507 in adjacent rack frames 506 (see FIG. 10B).

Figure 18C:
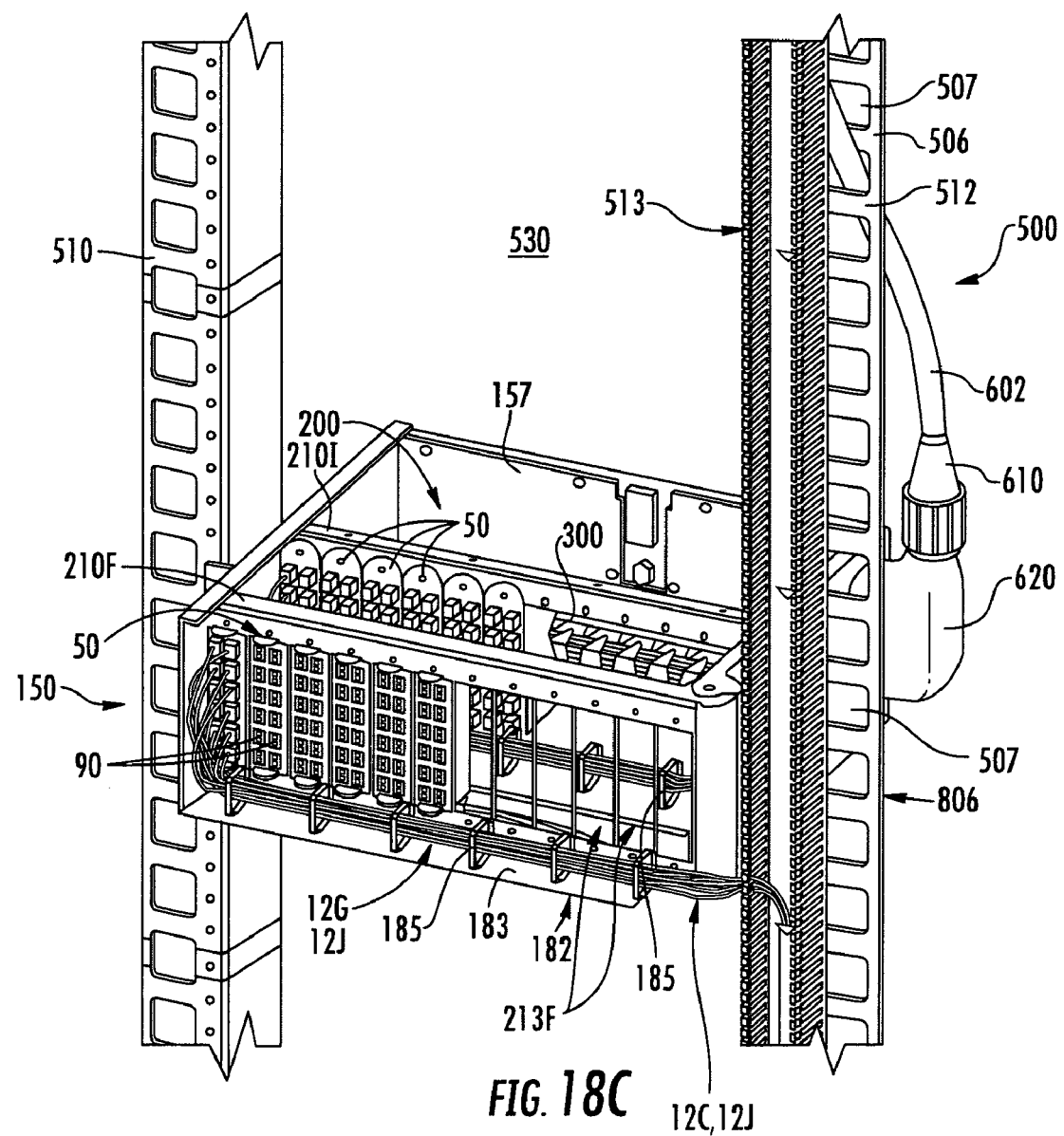
FIG. 18C is an elevated front perspective view of the rack assembly of FIGS. 18A and 18B, showing details of how the cable fibers are routed to the patch panel modules on the front and intermediate mounting frames.

FIG. 18C is an elevated front perspective view of rack assembly 500 of FIGS. 18A and 18B, showing details of how cable fibers 12C (or jump fibers 12J) are routed to patch panel assemblies 50 on the front and intermediate mounting frames 210F and 210I. Clips 185 on cross member 182 are used to guide cable fibers 12C or jump fibers 12J from rack frame 506 to patch panel assemblies 50 supported by front mounting frame 210F. Clips 185 are also provided between front and internal mounting frames 210F and 210I to assist in guiding cable fibers 12C or jump fibers 12J from rack frame 506 to patch panel modules 50 supported by internal mounting frame 210I.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A patch panel assembly for a telecommunication data center for providing optical connections using bend-insensitive optical fiber cables, comprising:
    a rectangular, box-like housing having an interior region, a front side and a back side and that is sized to be operably supported by a standard telecommunications rack; and
    a front mounting frame and at least one interior mounting frame, wherein the mounting frames are configured to support at least one reduced-form-factor patch panel module, wherein the at least one reduced-form-factor patch panel module has an interior and a plurality of jacks, each jack defining a front side port and a backside port.

2. The patch panel assembly of claim 1, wherein the jacks are connected to a plurality of bend-insensitive optical fibers at least partially contained within the module interior.

3. The patch panel assembly of claim 2, wherein the at least one reduced-form-factor patch panel modules have a depth dimension of between about 2" and about 3".

4. The patch panel assembly of claim 1, wherein the front mounting frame comprises two sections that swing outwardly from the housing so as to provide access to an adjacent interior mounting frame.

5. The patch panel assembly of claim 1, wherein the front mounting frame is configured to swing either outwardly, downwardly or upwardly so as to provide access to an adjacent at least one interior mounting frame.

6. The patch panel assembly of claim 1, further comprising:
    a front cover arranged at the front side adjacent the front mounting frame and spaced apart therefrom, the front cover configured to swing either outward, downward or upward so as to provide access to the front mounting frame.

7. The patch panel assembly of claim 1, wherein the at least one interior mounting frame is a backside-most mounting frame that presents a rearward facing substantially vertical mounting surface configured to support at least one patch panel module.

8. The patch panel assembly of claim 7, wherein the backside-most mounting frame is configured to open so as to provide access to an adjacent internal mounting frame.

9. The patch panel assembly of claim 1, wherein each mounting frame is configured to support between 10 and 12 patch panel modules each having a depth dimension of between about 2" and about 3".

10. The patch panel assembly of claim 1, wherein the front mounting frame is operably connected to the housing via a hinge assembly that defines a space that is open to the interior region and that is sized to allow optical fibers and/or optical fiber cables to be routed therethrough.

11. The patch panel assembly of claim 10, wherein the hinge assembly comprises an inner curved portion formed at an end of the front mounting frame and an outer curved portion formed on the housing, and wherein the front mounting frame and the housing are operably arranged so that the inner curved portion is rotatable within the outer curved portion.

12. The patch panel assembly of claim 1, further comprising:
    at least one bend-insensitive fiber optical cable that contains at least one bend-insensitive optical fiber; and
    a cable distribution box that defines at least one interior chamber and having an end with an aperture formed therein and open to the at least one interior chamber, and a front face having multiple apertures formed therein that are open to the at least one interior chamber, the cable distribution box arranged within the housing interior region and containing within the interior chamber at least a portion of the at least one bend-insensitive fiber optic cable.

13. The patch panel assembly of claim 12, wherein the at least one bend-insensitive fiber optic cable passes through the end aperture and through at least one of the front face multiple apertures prior to be connected to one of the at least one patch panel modules.

14. The patch panel assembly of claim 1, wherein the housing includes a bottom panel and further comprising a floor panel arranged adjacent the bottom panel within the interior region so to define an interior sub-region sized to accommodate the routing of one or more bend-insensitive optical fiber cables.

15. The patch panel assembly of claim 1, comprising multiple patch panel modules each having multiple ports so as to provide a port density PD in the range defined by:

72 ports/U<PD≦216 ports/U, wherein U is a standard 1.75 inch increment in a 19 inch equipment rack.

16. The patch panel assembly of claim 1, wherein the housing includes opposing sidewalls, the assembly further comprising:

at least one aperture in at least one of the sidewalls sized to allow multiple bend-resistant optical fiber cables to pass therethrough; and wherein each patch panel module is optically connected at a backside wall to a corresponding bend-resistant optical fiber cable.

17. The patch panel assembly of claim 1, further comprising;

a front outwardly extending shelf adjacent the front mounting frame; and at least one clip disposed on the front shelf and configured to guide or hold at least one fiber optic cable.

18. The patch panel shelf assembly of claim 1, wherein the front mounting frame includes a bottom edge and a hinged shelf that extends inwardly from the bottom edge, the inwardly extending shelf configured to guide or hold at least one fiber optic cable.

19. A rack assembly comprising:

a rack frame configured to support a plurality of patch panel assemblies in a stacked fashion; and one or more patch panel assemblies according to, claim 1 supported in the rack frame in a stacked fashion.

20. The rack assembly of claim 19, further comprising a main cable that carries a plurality of bend-insensitive fiber-optic cables that connect to one or more of the at least one patch panel modules within the housing.

* * * * *